March 22, 1949.  H. L. COOKE  2,464,793
METHOD AND APPARATUS FOR PHOTOGRAPHIC SCANNING
Filed Aug. 8, 1942  11 Sheets-Sheet 1
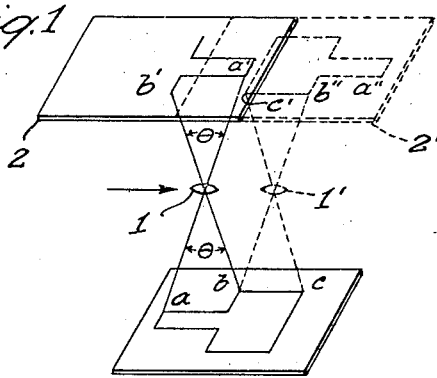
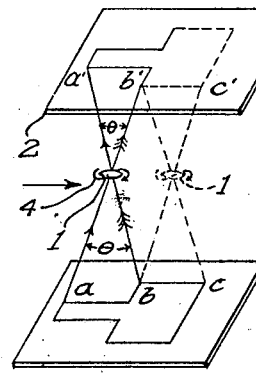
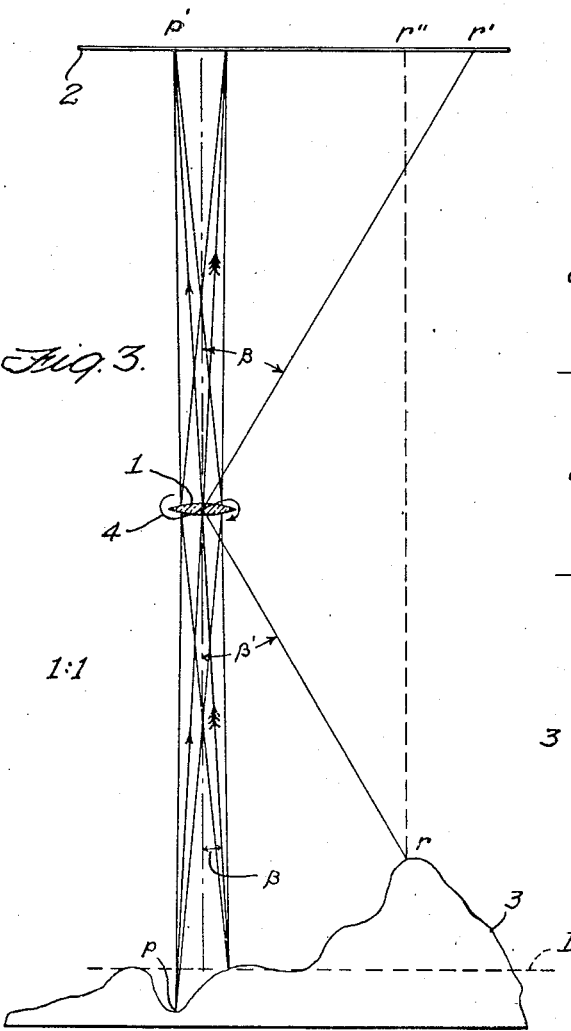
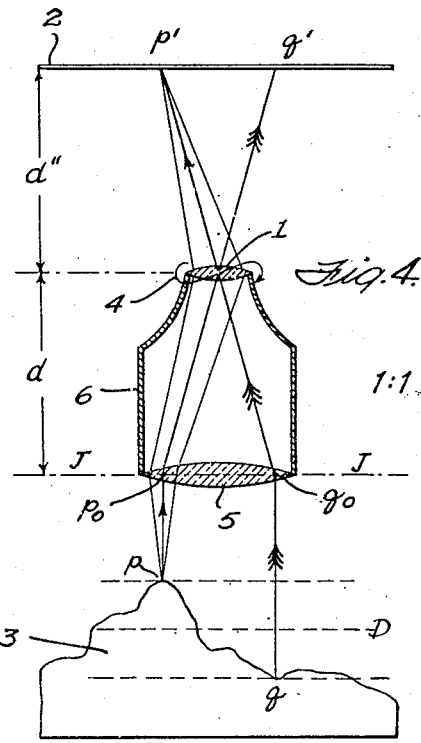
INVENTOR
H. L. COOKE
BY
ATTORNEYS March 22, 1949. H. L. COOKE 2,464,793
METHOD AND APPARATUS FOR PHOTOGRAPHIC SCANNING
Filed Aug. 8, 1942 11 Sheets-Sheet 2
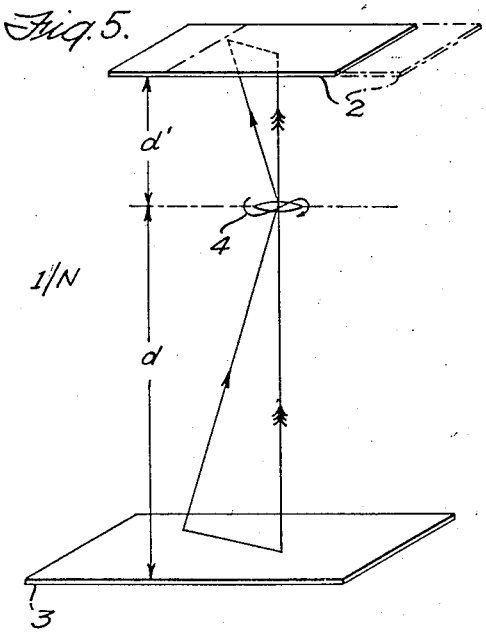
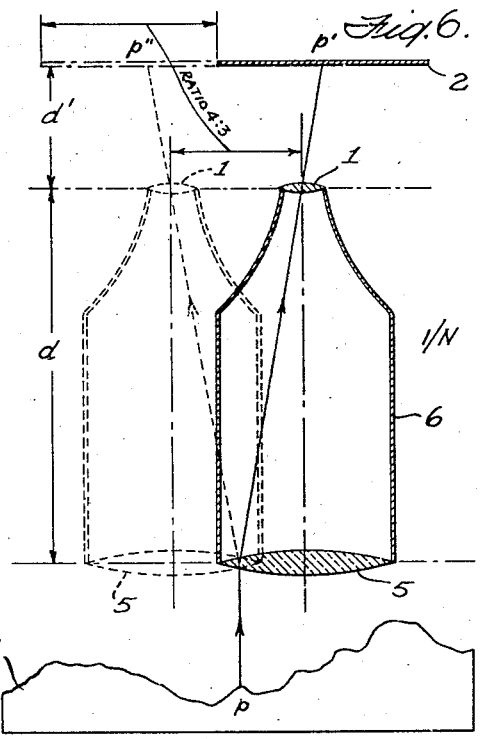
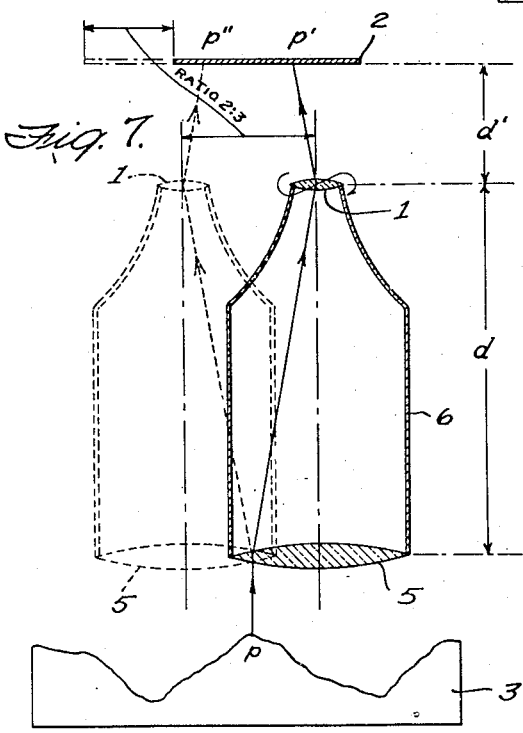
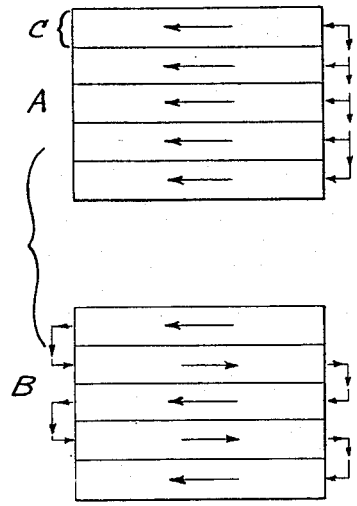
INVENTOR
H. L. COOKE
BY
ATTORNEYS

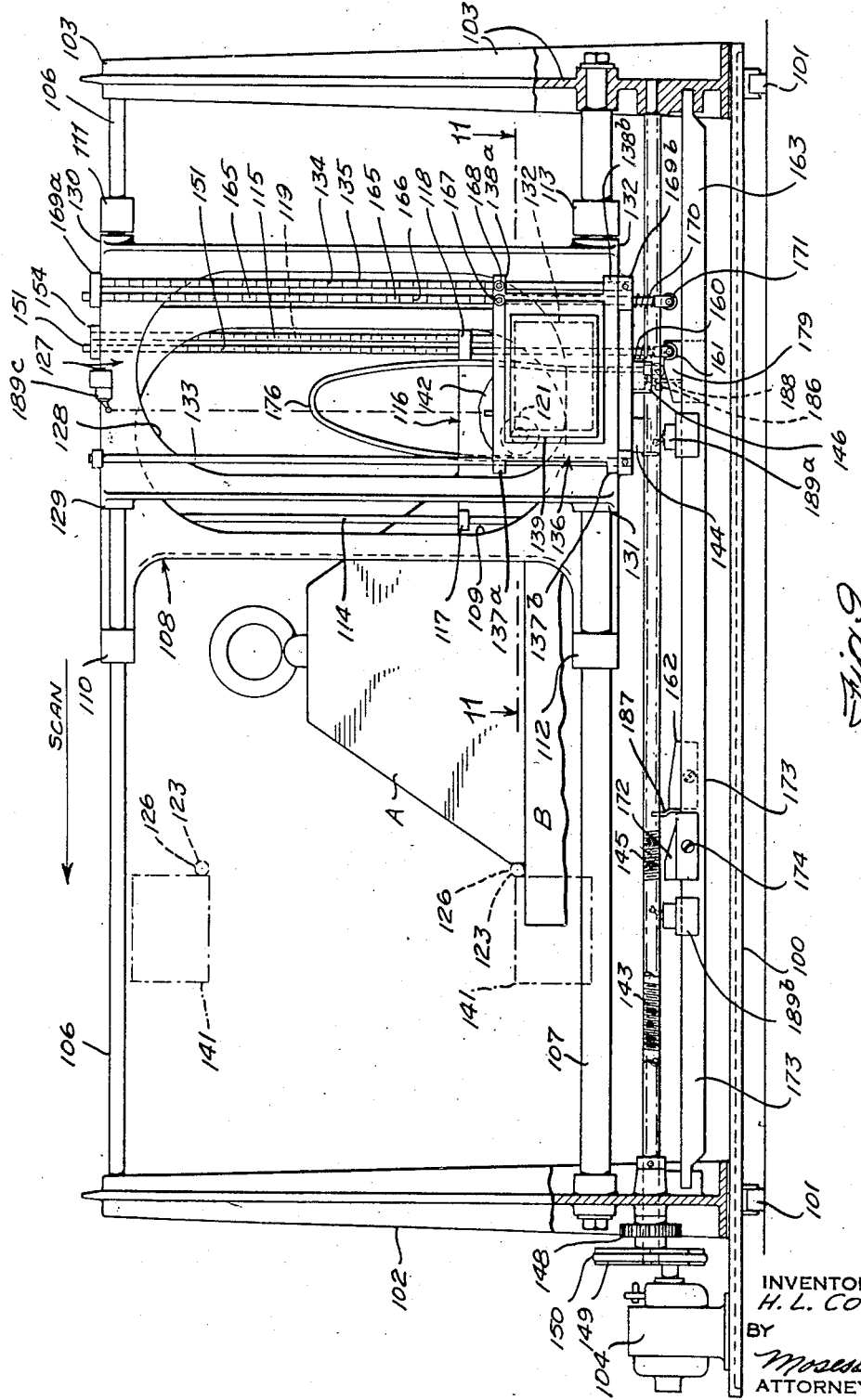

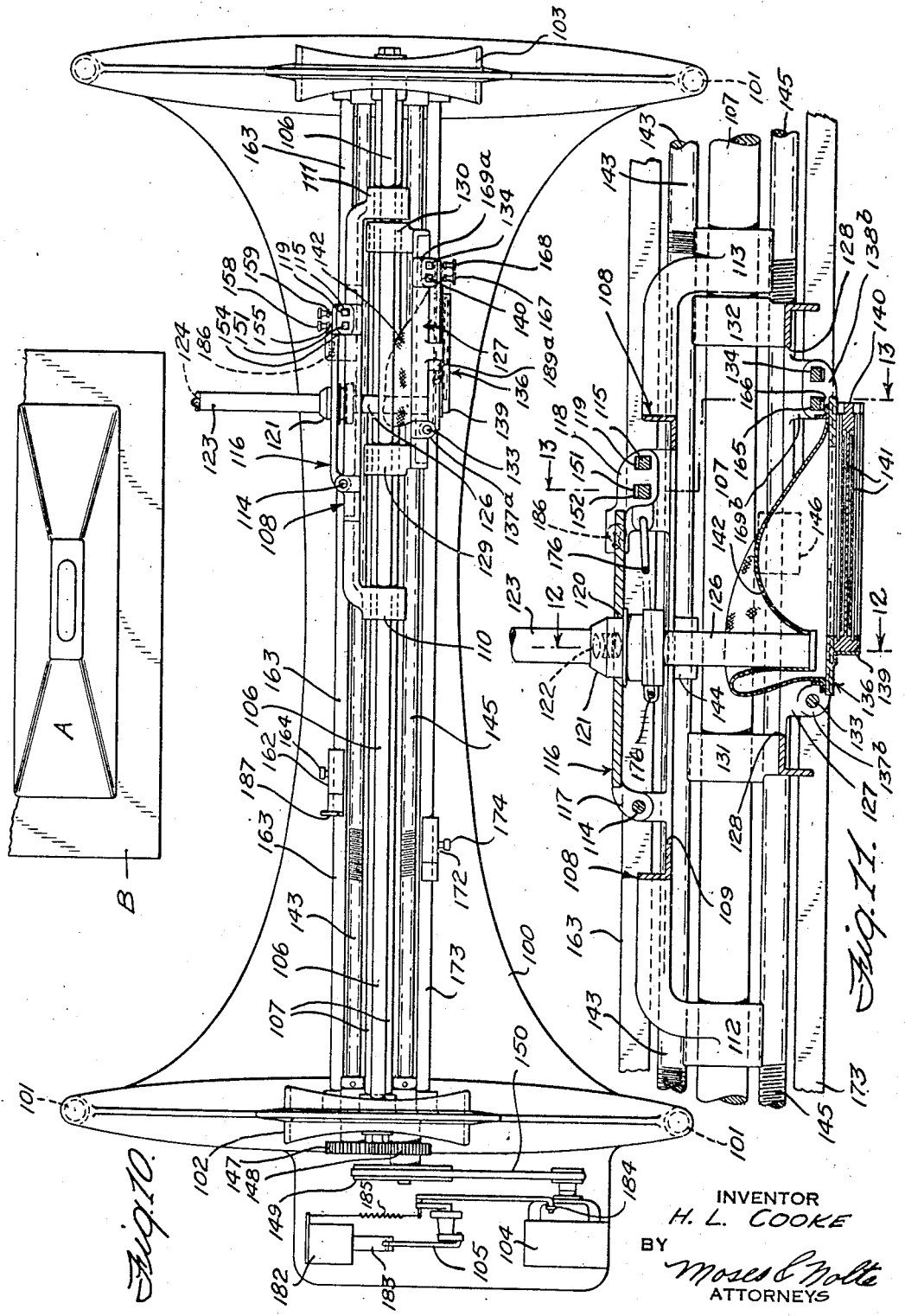

March 22, 1949.    H. L. COOKE    2,464,793
METHOD AND APPARATUS FOR PHOTOGRAPHIC SCANNING
Filed Aug. 8, 1942    11 Sheets-Sheet 5
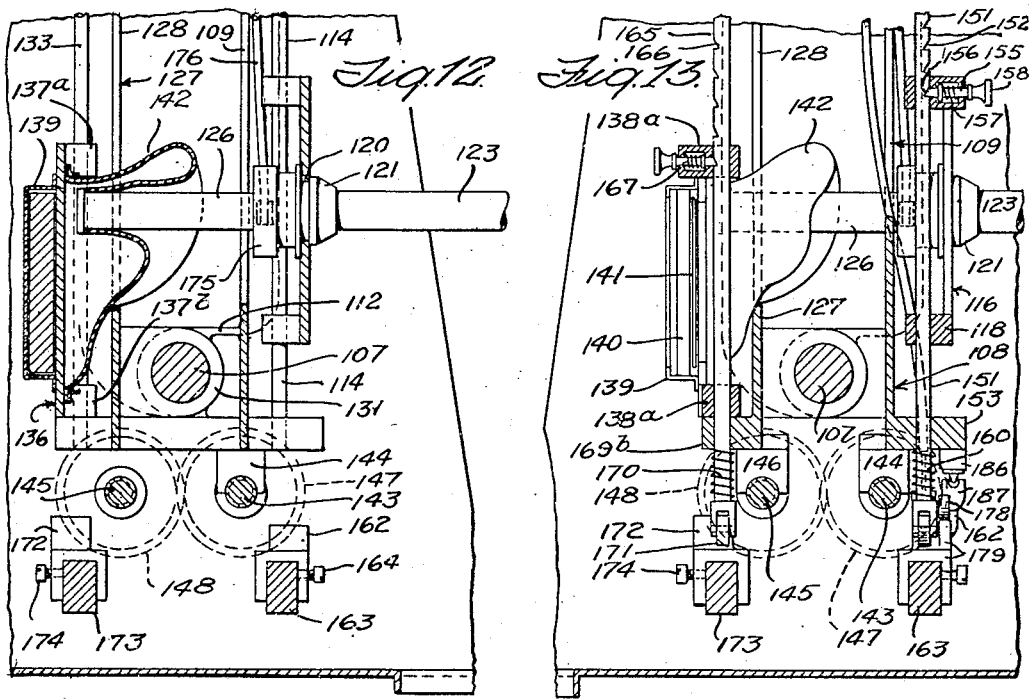
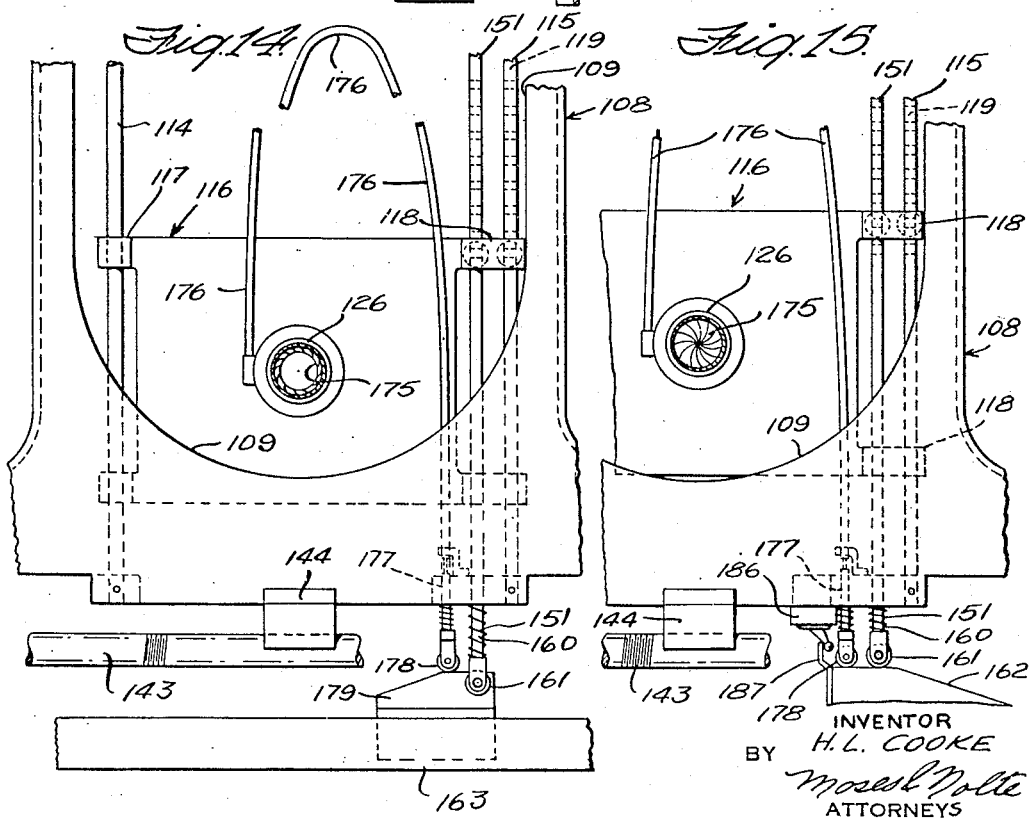
INVENTOR
H. L. COOKE
BY
ATTORNEYS March 22, 1949.  H. L. COOKE  2,464,793
METHOD AND APPARATUS FOR PHOTOGRAPHIC SCANNING
Filed Aug. 8, 1942  11 Sheets-Sheet 6
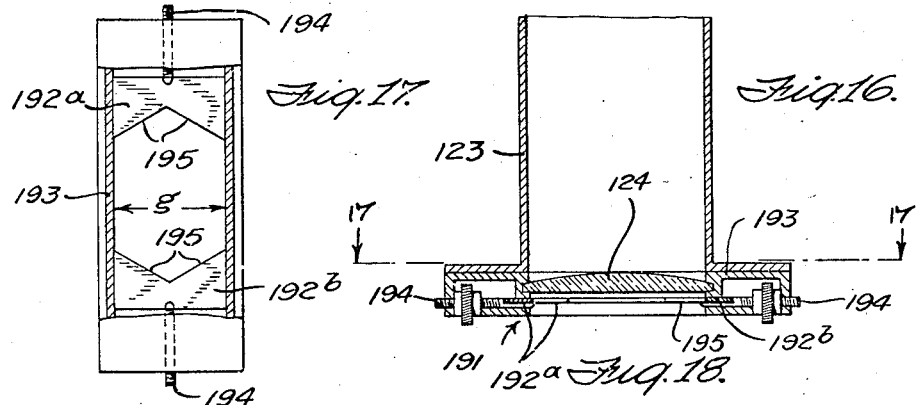
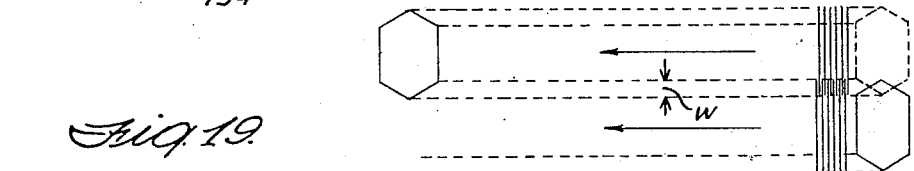
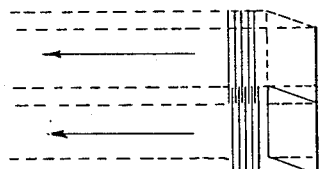
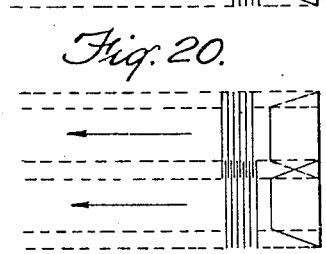
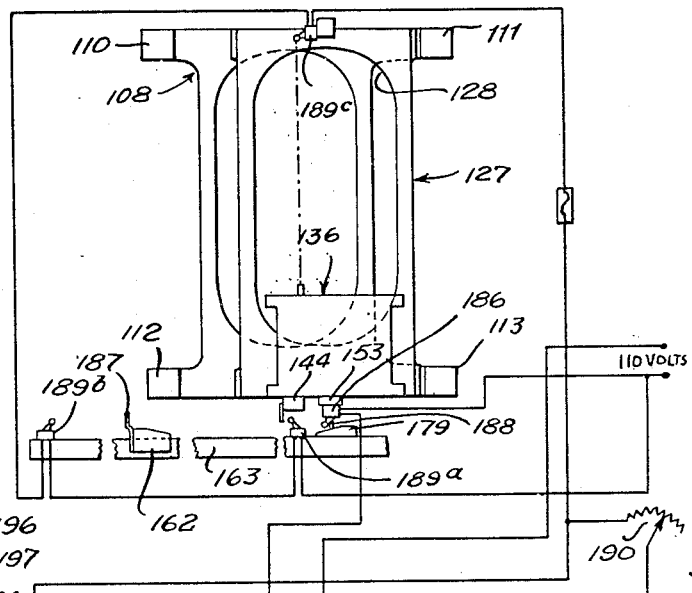
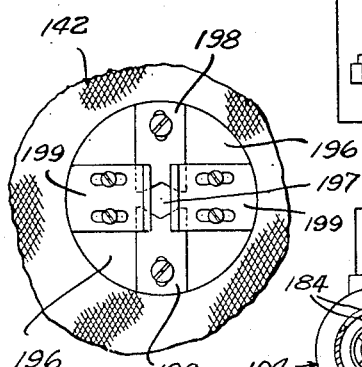
INVENTOR
H. L. COOKE
BY Moses & Nolte
ATTORNEYS

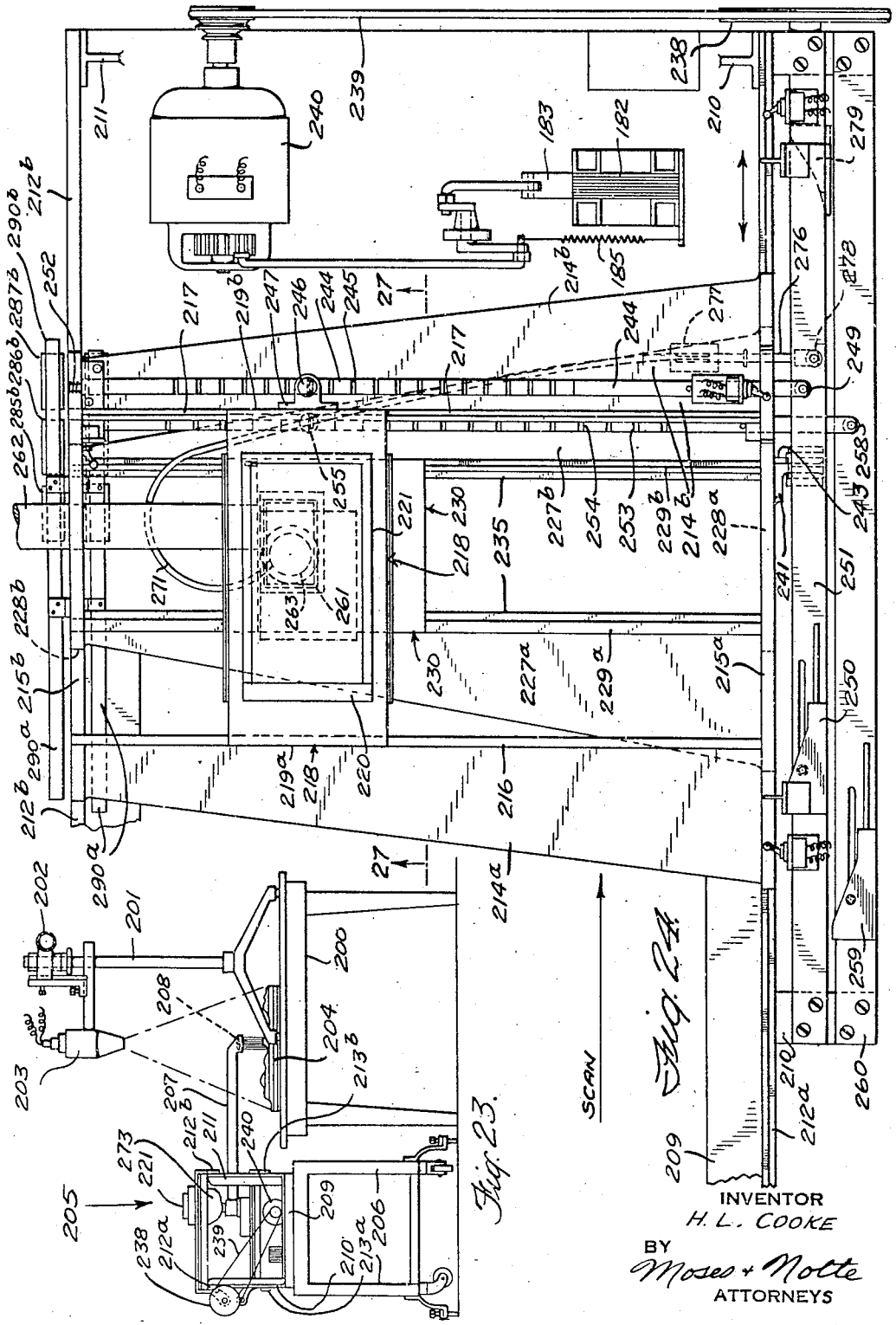

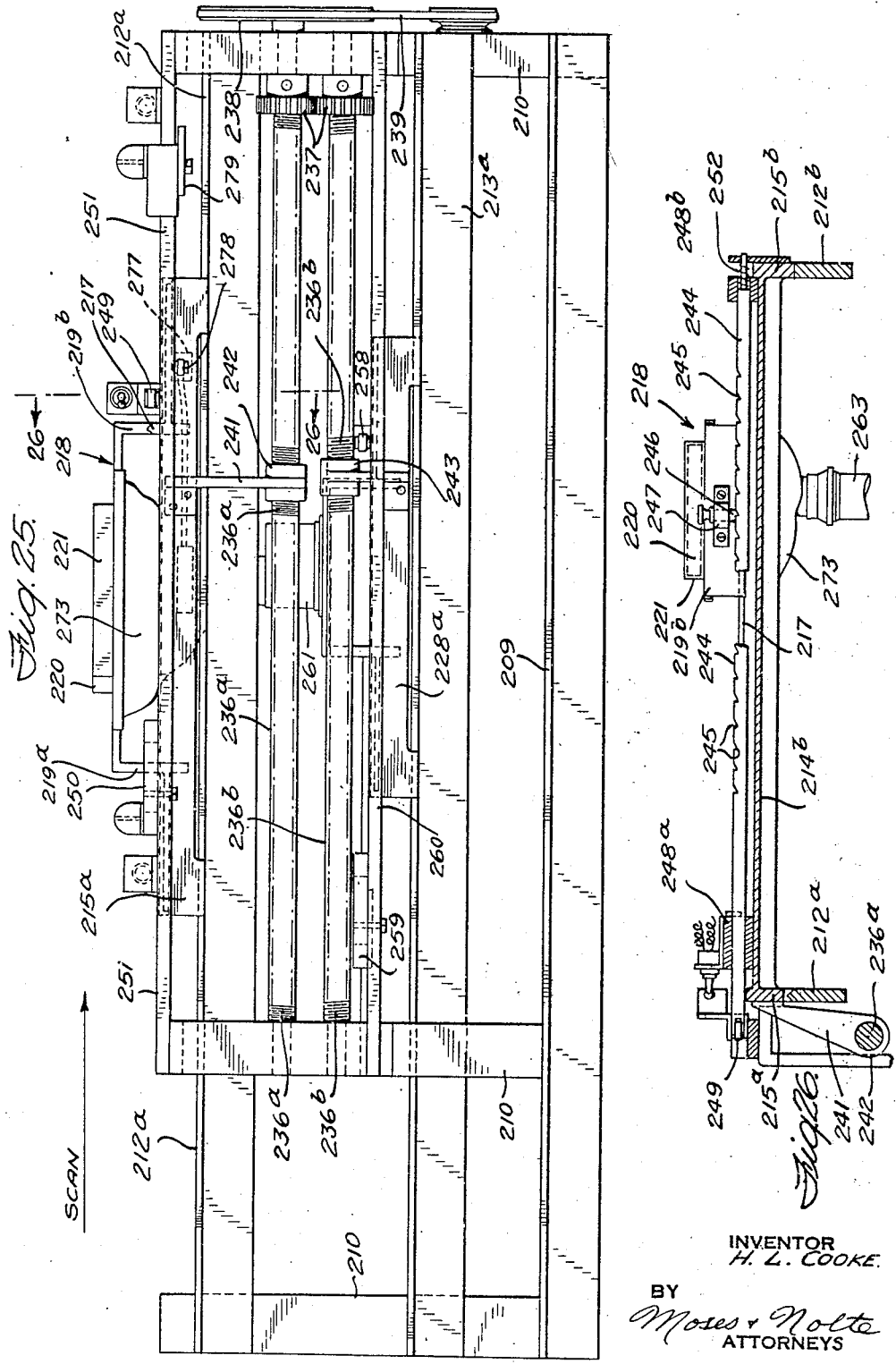

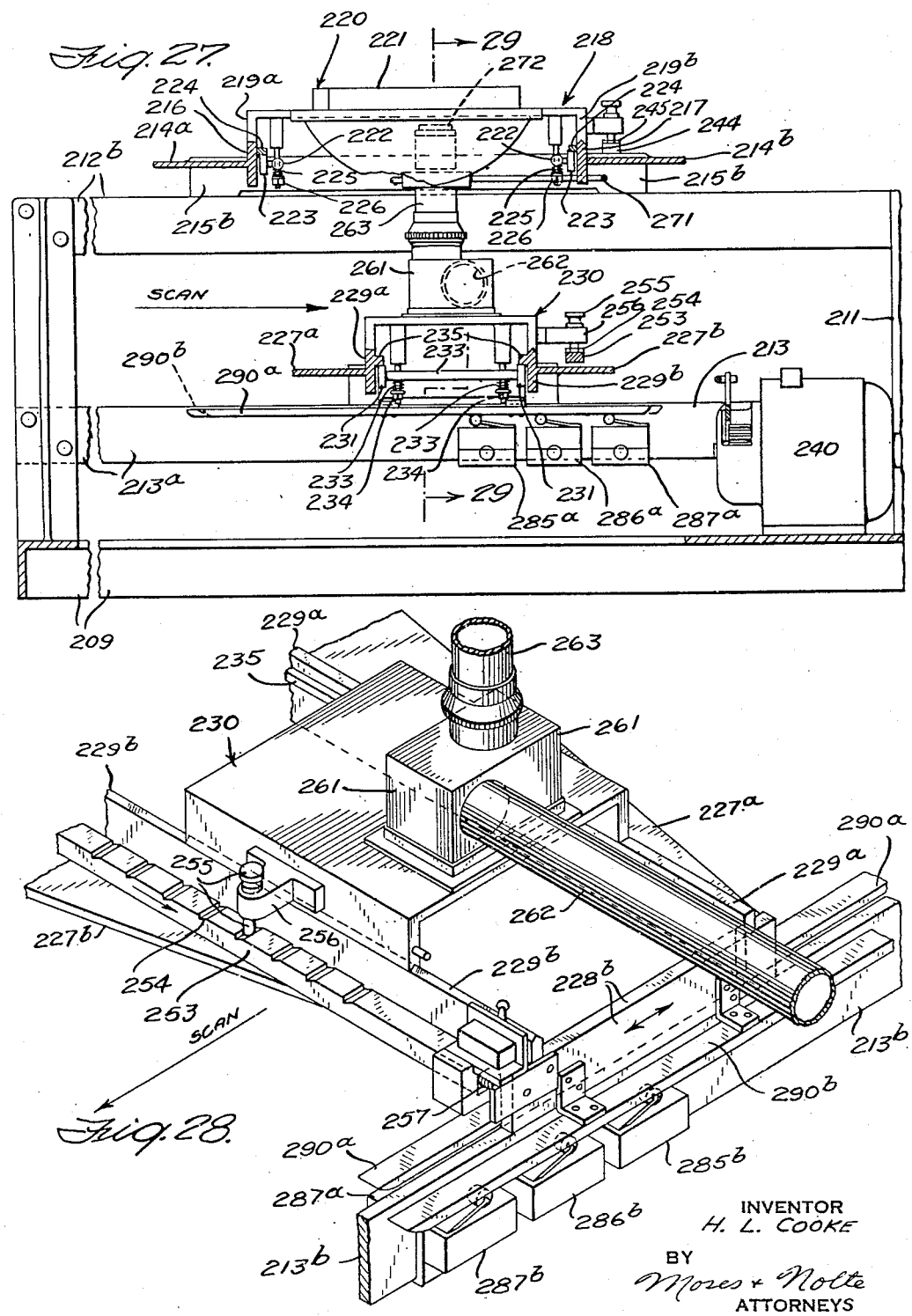

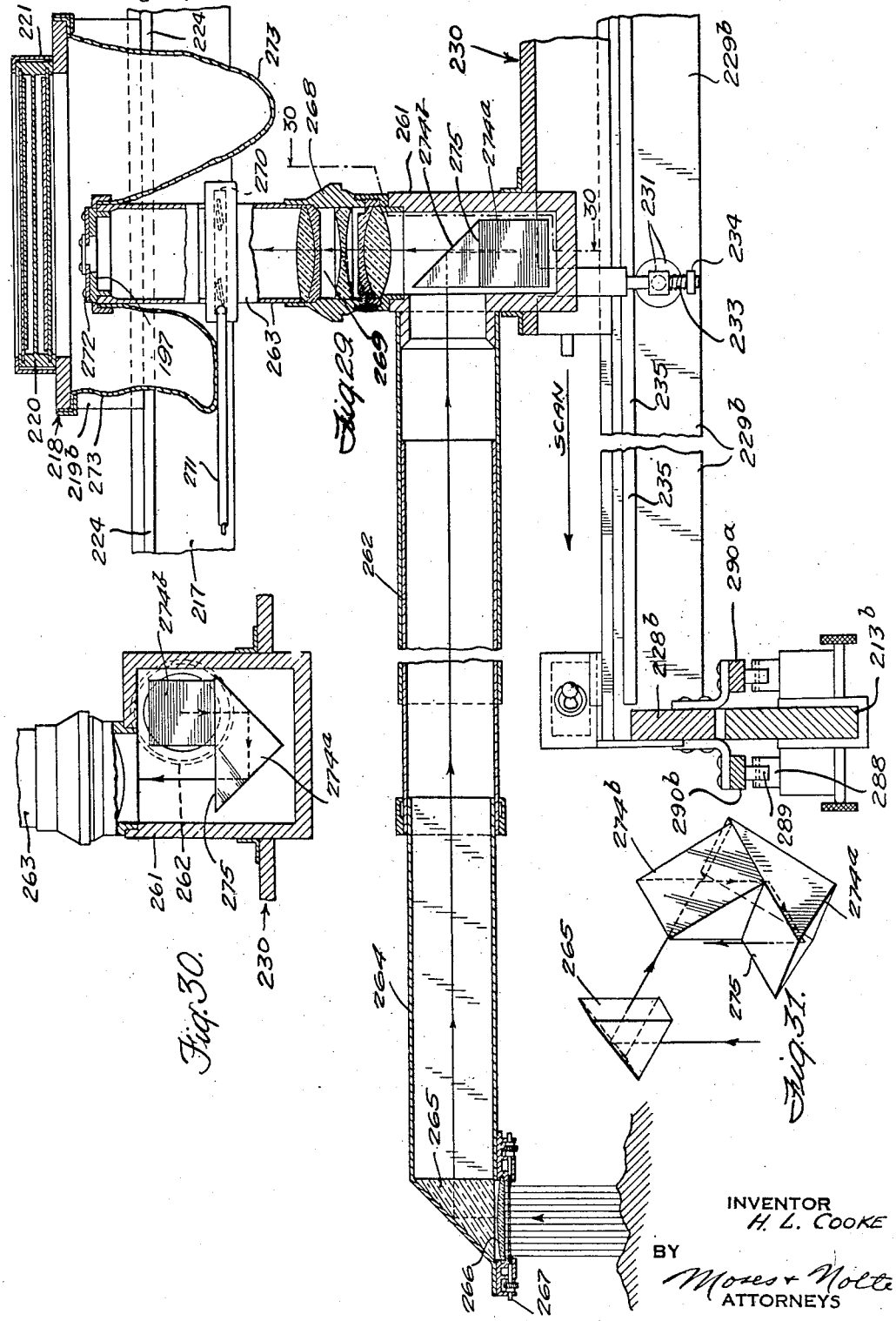

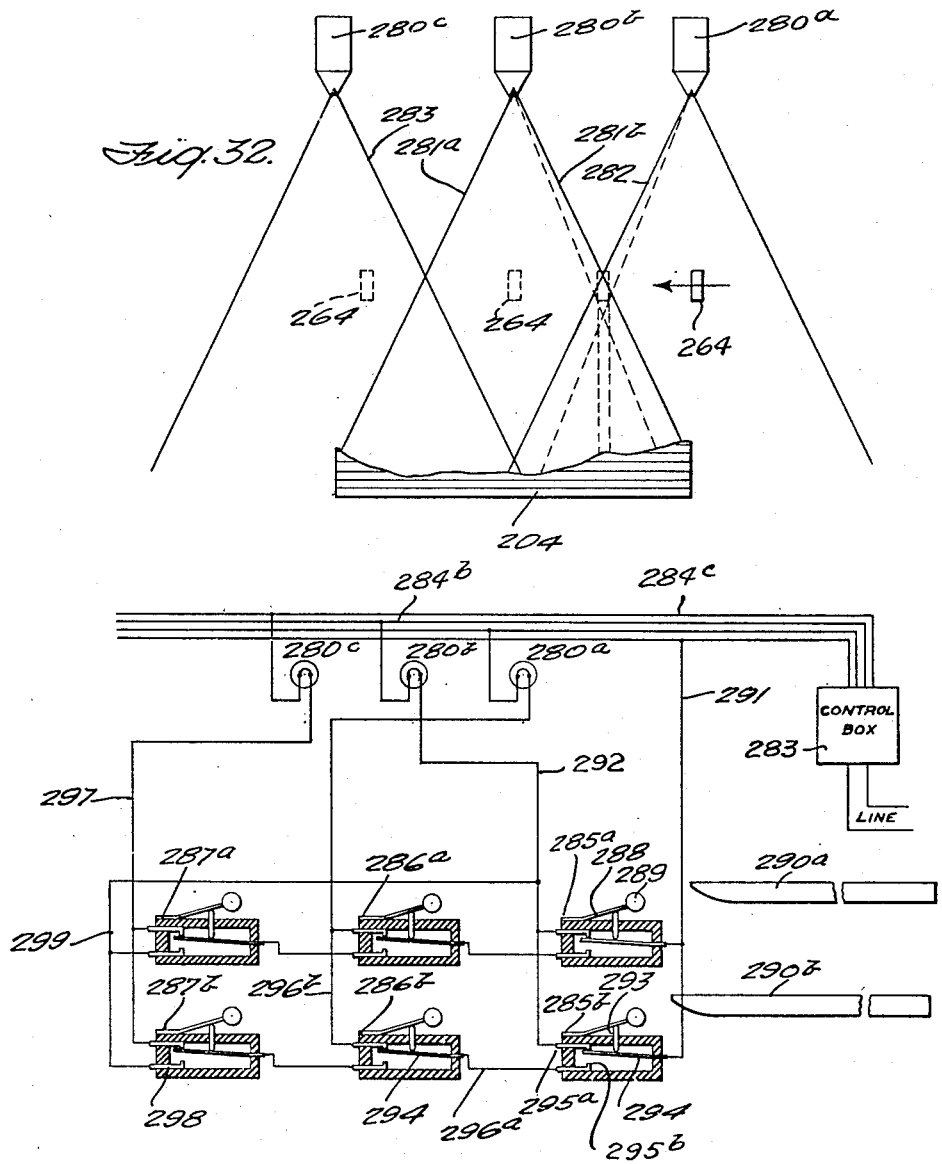

Patented Mar. 22, 1949

2,464,793

UNITED STATES PATENT OFFICE 2,464,793

METHOD AND APPARATUS FOR PHOTOGRAPHIC SCANNING

Hereward Lester Cooke, Princeton, N. J., assignor, by mesne assignments, to H. Lester Cooke, Jr., Priscilla Cooke Stewart, and Russell Prickett, as trustees Application August 8, 1942, Serial No. 454,108

24 Claims. (Cl. 88—24)

This invention relates to photographic scanning methods and apparatus. Its principal object is to provide a method of and apparatus for producing orthogonal photographic representations of objects or surfaces comprising portions of different elevation, which representations are free from errors or displacements due to parallax.

In the usual methods of taking photographs a camera is employed having a lens toward which the rays may be regarded as converging to a center. The photographic rays pass to the lens in the form of a cone and, due to the angularity of the rays with respect to the optical axis of the camera, there is a relative planimetric displacement of all features shown in the photograph which do not lie in any single datum plane of the object. All points of the object nearer to the camera than the datum plane show in the photograph as relatively displaced outward from the optical axis of the lens, while all parts of the object further from the camera than the datum plane are relatively displaced inward with respect to said axis. This is true of all photographs of solid objects taken in the ordinary way with any known form of camera, and thus it is impossible to use such a photograph as an accurate plan of the object, in which all the elements thereof are required to be shown in correct orthogonal relationship.

An outstanding example of the difficulties involved in utilizing a photograph as a plan from which measurements may be taken occurs in the case of photographs of terrain taken from airplanes, which it is desired to use as maps. Such photographs, even if taken from the highest altitudes at which it is practicable to fly and take photographs, are subject to serious distortion, particularly if the photographs are of hilly or mountainous country, and it is therefore not feasible to use such photographs directly as maps or plans of the country. Accurate measurements cannot be taken directly from such maps. Numerous efforts have been made to correct airplane photographs so as to render them more available as maps, but all known methods of correction are only crude approximations and cannot take care of the intricate irregularities of the surface photographed.

In my application for U. S. Patent, Serial No. 328,175, filed April 6, 1940, Patent No. 2,309,752, dated February 2, 1943, I have disclosed a method of producing orthogonally corrected photographs of terrain and of preparing maps therefrom, which corrected photographs and maps are accurate within the limits of observable error, although theoretically a slight deviation from exact orthogonal accuracy will be present. In general the method specifically disclosed in that case involves the preparation of a three dimensional scale model of the terrain or object photographed, the projection of the photograph on such model, and the rephotographing of the model with the projection thereon from a very long distance, approximating infinity, so that the cone of rays arriving at the camera from the model and producing the photograph is of exceedingly small angle. This reduces errors to a point where they are not objectionable and for practical purposes may be disregarded. For instance in the case of aerial photographs, it is possible to carve a three dimensional scale model of terrain shown in two over-lapping aerial photographs and then to rephotograph this model, with the photographic representation projected thereon, from a distance which would result in a photograph equivalent to one taken from an airplane flying 100 miles above the terrain represented. This produces a corrected photograph from which a map can be made which is accurate as to planimetry within the limits of measurable error. At the same time it is possible to use for photographing the model a very long focus lens, or telephoto lens system, which enables the corrected photograph to be made on a sufficiently large scale to preserve the detail of the original airplane photograph. The taking of very long focus photographs, however, as contemplated in my application for patent above referred to, involves certain practical objections, such as the necessity for a room or studio permitting the camera to be set up at a distance from the object photographed of perhaps 50 to 100 feet. It also involves an exceedingly solid mounting for the camera so as to avoid vibration effects, and the use of costly, long focus lenses.

Another method of producing orthogonally adjusted photographs is disclosed in my application for U. S. Patent, Serial No. 436,747, filed March 30, 1942, now abandoned. This method involves utilizing a telecentric lens interposed between the camera lens proper and the object, placed so that its principal focus is coincident with the outer nodal point of the camera lens, the two lenses being arranged coaxially. If the telecentric lens is of proper design and is co-extensive in area with the object to be photographed, or with such part thereof as is to be photographed in a single exposure, it in effect transmits to the camera lens only rays leaving the object in directions parallel to the axis of the lens system, so that the photograph of the object is in effect identical with one photographed only by means of such parallel rays. While this method substantially eliminates the effects of parallax or perspective, it is subject to the limitation that the size of the object which can be photographed at one exposure can be no greater than the size of the telecentric lens employed. In the case of objects of considerable dimensions this difficulty might be obviated by shifting the camera laterally, without altering the orientation of its axis, photographing different portions of the object in succession, and then piecing these views together to form a connected whole. There are serious practical objections to this procedure. But if large objects are to be covered by single exposures very large telecentric lenses are required, which are costly, and which present serious problems of design and manufacture if the introduction of perceptible lens aberrations is to be avoided. It is also difficult, if not impossible, to use a large telecentric lens to photograph a model of terrain while projecting a photograph of the terrain on the model, because the lens will distort the path of the projected rays.

In accordance with the present invention the objections to both of the methods above referred to are obviated. In the preferred embodiment the method employed is in a sense a modification of the procedure referred to above, viz. that of photographing the object in successive portions. But instead of photographing different parts of the object in separate operations and then piecing the resulting pictures together the method is employed of effecting continuous relative motions between the optical system, photographic plate and object in such a manner that the photographing of successive portions of the object is carried out as a continuous process and not as a step by step procedure. This relative motion is so effected as to cause the different portions of the photograph to appear in the form of a continuous picture on the plate, requiring no piecing of picture parts to achieve a connected photographic representation of the entire object. At the same time the theoretical errors due to conical projection involved in the process of the Patent No. 2,309,752, are avoided and it is possible to use a lens system of simple design and moderate dimensions which will produce an orthogonal projection accurate to within the limits of experimental error. The apparatus used is compact and efficient and can readily be constructed to produce orthogonally corrected photographs of objects of any reasonable size.

Stated broadly the present invention embodies a process and apparatus for photographically scanning the object to be represented. The object, photographic plate, and the camera, equipped, in one form of apparatus, with a telecentric optical system, are maintained by coordinated motions of one or more of these elements in such relation that a point to point orthogonal correspondence between elements of the object photographed and corresponding elements of the plate on which the image is recorded is maintained continuously during the process of exposure, and in this way it is possible to produce a continuous exposure on a single plate covering an area of much greater extent than that included in the instantaneous field of view of the optical system employed. If the movements are so carried out that the optical axis of the system is maintained normal to the fixed plane of the photographic plate, orthogonal projections of large objects or areas may be obtained. The elimination of errors due to parallax may be substantially accomplished even without the use of a telecentric system because it is possible to employ an optical system having a very small field of view, so that the area photographed at any instant subtends a cone of rays of very small angle. The rays passing from the object to the camera lens at any given instant may therefore be treated as substantially parallel to each other and to the optical axis of the system. The progressive scannning of the object in this way permits an area of any reasonable extent to be photographed in continuous orthogonal projection.

In the preferred embodiments of my invention I combine the use of a telecentric optical system with scanning apparatus such that a photograph is produced in which parallax is wholly eliminated, the only remaining errors being those due to imperfection of lenses and mechanical construction of the apparatus. Since the field of view of the optical system is restricted to a small angle the imperfections and aberrations of the lenses produce no detectable errors in the photograph. Also the apparatus is such as to lend itself readily to precision methods of manufacture. Thus the residual errors of the process may readily be made too small to be detected.

While my invention is of broad application to the photographing of objects, it is especially applicable to the production of planimetrically corrected photographs and photographic or phototopographic maps of terrain from which all effects of parallax, or perspective, have been eliminated. By the use of a scanning apparatus as described which has a small objective covering at any instant only a very small part of the model to be photographed, it is possible to photograph a model of the terrain while the same has the original photograph projected on it. The movable scanning element is so arranged and operated as not to interfere with such projection, and thereby enables the production of a planimetrically adjusted photograph of the terrain, equivalent in all respects to the original photograph thereof, except that it has been orthogonally corrected.

In some embodiments of my apparatus it is also possible to adjust the scale of representation as a part of the photographic scanning process, thus making it possible to produce any desired reduction in scale of the corrected photographs so as to make them suitable for direct employment in ordinary enlarging and map drawing projectors. Of course the scanning apparatus could also be arranged to produce an enlarged photograph if desired, but it is in most cases convenient to produce a reduced photograph. The scanning apparatus is compact and can be made practically automatic in operation.

In the accompanying drawings in which certain preferred embodiments of the invention are chosen to illustrate the principles thereof Figures 1 and 2 are diagrams illustrating the general principle of operation of the invention.

Figure 3 is a diagram showing how distortions due to parallax are reduced by diminishing the field of view of the lens.

Figure 4 is a diagram showing the use of a telecentric system for production of an orthogonal photograph of the same dimensions as the object.

Figure 5 is a diagram showing how an orthogonal photograph may be produced with reduction of scale by moving the plate as well as the scanning optical system.

Figure 6 is a diagram showing the use of a telecentric system with reduction of scale, and without the use of an image erecting system.

Figure 7 is a diagram similar to Fig. 6 but showing the effect of introducing an image erecting system.

Figure 8 is a pair of diagrams, A and B, showing two alternative paths of the scanning system over the object.

Figure 9 is a rear elevation of a practical embodiment of the apparatus suitable for photographing any object of which it is desired to produce an orthogonal photograph, the moving parts being shown in the positions which they occupy at the beginning of the scanning operation, and certain parts being indicated in dotted lines in subsequent positions.

Figure 10 is a plan view of the apparatus shown in Fig. 9.

Figure 11 is a horizontal section of a part of the apparatus taken on line 11—11 of Fig. 9.

Figure 12 is a vertical transverse sectional view taken on line 12—12 of Fig. 11.

Figure 13 is a similar view taken on line 13—13 of Fig. 11.

Figure 14 is a fragmentary rear elevation of the apparatus showing the optical frame and carriage at the beginning of a scanning path, the lens tube being shown in vertical section.

Figure 15 is a view similar to Fig. 14 showing the optical frame and carriage at the end of a scanning path.

Figure 16 is a view in transverse vertical section through the end of the optical tube nearest to the object showing the telecentric lens and its adjustable aperture mask.

Figure 17 is a horizontal sectional view on line 17—17 of Fig. 16 showing the mask.

Figure 18 is a diagram showing the overlapping of the mask positions during two successive scanning paths.

Figure 19 is a diagram similar to Fig. 18 showing a different shape of mask.

Figure 20 is a diagram similar to Figs. 18 and 19 showing still another shape of mask.

Figure 21 is a fragmentary elevation showing an adjustable aperture mask which may be used at the end of the optical system adjacent to the plate, in place of the mask equipment shown in Figs. 16 to 20 inclusive.

Figure 22 is a diagram showing parts of the machine in rear elevation and illustrating the motor reversing mechanism, reversing and safety switches, and electrical connections.

Figure 23 is a diagrammatic view in end elevation showing a modified form of apparatus, particularly suitable for the photographing of models of terrain under a projection apparatus such as a series of Multiplex projectors, the Multiplex apparatus also being shown.

Figure 24 is a plan view of part of the modified form of apparatus shown in Fig. 23.

Figure 25 is a rear elevation of the apparatus shown in Fig. 23.

Figure 26 is a transverse vertical section on line 26—26 of Fig. 25.

Figure 27 is a longitudinal vertical section on line 27—27 of Fig. 24.

Figure 28 is a perspective view from the front showing parts of the optical system, and the carriage and front track for the same.

Figure 29 is a transverse vertical section on line 29—29 of Fig. 27 showing the optical system.

Figure 30 is a longitudinal vertical sectional view on line 30—30 of Fig. 29 showing a part of the image erecting prism system.

Figure 31 is a perspective diagram of the image erecting prism system.

Figure 32 is a diagram showing a series of Multiplex projectors illuminating a model of terrain and indicating how the casting of shadows on the model by the scanning tube is avoided, and Figure 33 is a wiring diagram showing the mode of illuminating the projectors at the proper times and in proper sequence.

Figure 1 shows the principle of the invention in the simplest form required to produce a photograph of an object $a, b, c$, by means of a lens 1 having a field of view included within the solid angle $\theta$, this field not being of sufficient size to cover the entire object. In order to photograph the entire object, $a, b, c$, the lens is moved progressively over the object to the position 1'. The image will appear in inverted position $a'$ $b'$ $c'$ on the photographic plate 2, and by progressively moving the plate, in continuous synchronism with the movement of the lens but at double the speed, to the position 2', a point to point correspondence between elements of the object and corresponding elements of the image on the plate is maintained throughout the exposure. Thus the image position $b'$ of the point $b$ will move to the position $b''$ as the lens and plate move in synchronism from positions 1, 2 to positions 1', 2'. The image $a'$ of the point $a$ as recorded on the plate at the beginning of the exposure will move to the position $a''$ where it will be out of the field of the lens, and at the end of the scanning operation the image of the point $c$ will be recorded on the plate at $c''$. All the intermediate points will be similarly recorded as the lens and plate travel. In Fig. 1 the distances between the object and lens, and between the lens and the plate are equal and the image will be the same size as the object. The plate will thus have to be moved at twice the speed of the lens, the object remaining stationary.

Since the effect produced depends on motions changing the relative configuration of the lens, the plate and the object, it is obvious that any combination of motions of these three elements which will result in the same change in relative configuration will accomplish identical results. Thus the plate may be maintained stationary and the object moved at twice the speed of the lens, in the same direction; or the lens may be maintained fixed and the plate and object moved with equal speeds in opposite directions. The same principle holds true throughout this specification in all cases where relative motion between lens, plate and object is specified, as any combination of motions of these three elements which will result in the same change in relative configuration may be substituted for the combination of motions specified.

Figure 2 shows the effect of introducing into the system an image erecting optical device, such for instance as a pair of erecting prisms. The presence of such an image erecting device is indicated conventionally by the S-shaped arrow 4 passing through the lens. With such an optical system it will be seen that the image will remain stationary as the lens and erecting system are moved as a unit, so that both the plate and the object will remain stationary if the lens is half way between the object and the plate and a full size photograph of the object is made. This appears by considering for instance the ray leading from the point $b$, through the lens and erecting system to the image point $b'$. The image of the point $b$ remains stationary on the stationary plate at $b'$ throughout the scanning movement between the two indicated positions of the lens with erecting system.

Figure 3 illustrates the effect of scanning with a lens system covering a very small field of view as compared with the use of a lens system covering a large field. For instance, if it is desired to photograph on plate 2 a model of terrain 3, this may be done by scanning the model with a lens 1 covering a small field of view, the system being shown as also provided with an image erecting system indicated by the arrow 4. One-half the field of view is indicated by the angle $\beta$. For purposes of comparison a large field of view, such as would be required if a lens were used adapted to cover the whole or a considerable part of the model, is also indicated, half of such field of view being indicated by the angle $\beta'$. If the model were photographed with a lens including the wide field of view it will be seen that large errors in planimetry would appear in the photograph on plate 2. For instance, if a point $r$, a considerable distance above the datum plane D of the model, were photographed, such point would appear at $r'$ on the plate, whereas it would appear at the point $r''$ if the photograph were correct in planimetry. The distance between $r'$ and $r''$ would thus represent the displacement error of the image of the point $r$ in the photograph. However, if only a small field of view is covered, indicated by the angle $\beta$, the displacement of the point $p$, for example, would be so slight as to be negligible and the point $p$ would appear on the plate at $p'$ in approximately the correct position. The same would be true of all points photographed by the lens of small field of view as it moved across the object being scanned. Thus with a sufficiently small field of view differences in elevation of the points on the object would not result in displacement errors of measurable amount. By scanning the object with a lens of small field, therefore, a photograph substantially accurate in planimetry can be secured without making the distance from the object to the plate excessive or using extremely long focus lenses.

Fig. 4 shows how an object may be scanned by the use of an optical system including a telecentric lens 5. In this system the telecentric lens 5, camera objective 1, and image-erecting system indicated by the arrow 4, are mounted on a common support or optical tube 6 which can be moved normal to the axis of the system so as to scan the object or model 3. The principal focus of the telecentric lens 5 coincides with the outer nodal point of the lens 1, the two lenses being arranged coaxially. Lenses arranged with respect to each other in this manner will be referred to as in telecentric relationship. With the telecentric lens 5 and camera objective 1 in such specified relationship any ray passing from an element of the object 3 to the telecentric lens 5 in a direction parallel to the common axis of the two lenses will be refracted by the lens 5 so as to proceed toward the outer nodal point of the lens 1, and will subsequently proceed along a parallel path, intersecting the inner nodal point of the lens 1, till it reaches the plate 2. If the optical system is properly focused on the object 3 a clear image of the said element of the object 3 will be formed where the above specified ray meets the plate 2. In dealing with telecentric systems in adjustment as specified above, rays which in their passage between the object and photographic plate pass along lines directed toward and away from the nodal points of the camera objective will be referred to as nodal rays. Such rays are marked with arrowheads in Fig. 4. Consideration of this figure will show that the nodal rays from the points $p$ and $q$ on the object 3, irrespective of the distances of these points from the datum plane D, project orthogonally on an imaginary plane J—J passing through the lens 5, normal to its axis, at the points $p_0q_0$. The objective 1 projects a scale reproduction $p'q'$ of the points $p_0q_0$ on the plate 2. Since $p_0q_0$ forms an orthogonal projection of $pq$, and since $p'q'$ is a scale reproduction of $p_0q_0$, it follows that $p'q'$ is a scale orthogonal projection of $pq$ taken parallel to the common lens axis. The scale of this projection $p'q'$ is directly proportional to the ratio of the distances of the plate 2 and telecentric lens 5 from the objective 1. This general condition holds true for all telecentric systems referred to in this specification. Rays other than nodal rays passing from any single element on the object 3 through the lenses 5 and 1 and brought to a focus on the plate 2 will focus at the same point as the nodal ray originating from the same element. Thus it is seen that the nodal rays determine the image positions of elements from which they originate and other rays radiating from these elements and brought to a focus on the plate meet the plate at the same points as the corresponding nodal rays, so that their main function may be regarded as that of augmenting the intensity of the image formed by the nodal rays.

Returning now to Fig. 4 it will be seen that the images $p'$ and $q'$ of points $p$ and $q$, for instance, appear in correct planimetric position on the plate irrespective of the relative elevations of points $p$ and $q$. In the system shown in Fig. 4 the distance $d$ from the telecentric lens 5 to the camera lens 1 is equal to the distance $d''$ from the camera lens 1 to the plate 2. The image on the plate 2 will thus be of unit magnification, and the images of all elements of the object 3 will remain stationary on the stationary plate 2 as the lens system is moved to scan the object. Thus with the arrangement shown in Fig. 4 both object and plate will remain stationary, and only the optical system will have to be moved.

Fig. 5 shows how a photograph of an object 3 of any desired scale may be produced as a part of the scanning operation. In the example shown, the distance $d$ from the object to the lens is made three times the distance $d'$ from the lens to the plate, so that there is a reduction in the size of the image of 1:3 such ratio being designated by $1/N$. In this arrangement an image erecting system is employed, as indicated by the S-shaped arrow 4. In the case of such a change in scale in photographing a fixed object 3 it is necessary to produce relative motion between the optical system and the plate so as to maintain a point to point correspondence between elements of the object and the images of such elements, in fixed positions with respect to the moving plate 2. It may be shown theoretically that if the scale of reduction of the image is to be $1/N$, in order to prevent movement of the image with respect to the plate, when an image erecting system is employed the plate and the optical system must be moved in the same direction through distances in the ratio $(1-1/N):1$, whereas when no image erecting system is employed the ratio of corresponding displacements must be $(1+1/N):1$. In the arrangement shown in Fig. 5, since $N=3$ it follows that for each displacement of the optical system the plate must be given a corresponding displacement two thirds as great, in the same direction. Under these conditions the image on the plate 2 of any element of the object 3 will maintain a fixed position on the plate 2, and thus may be recorded photographically without blurring.

Figures 6 and 7 show how scanning systems, including telecentric lenses, may also be used to produce photographs at a different scale from full size. In both instances depicted the distance $d$ from the telecentric lens 5 to the camera lens 1 is three times the distance $d'$ from the camera lens 1 to the plate 2. Thus in both cases the reduction in scale, $1/N$, is 1:3. Fig. 6 shows an optical system without image erection, while Fig. 7 shows the effect of introducing an image erecting device. If there is no image erection, as in Fig. 6, then the plate must move faster than the optical system, in the ratio 4:3, while if there is image erection, as shown in Fig. 7, then the plate does not have to move as fast as the optical system, the ratio of the two speeds being 2:3. In the first case the ratio of the distance moved by the plate to the distance moved by the optical system is $(1+1/N):1$, while with erection of the image the relative distance moved by the plate and optical system is represented by the ratio $(1-1/N):1$.

In scanning objects of any considerable size it is usually not possible to cover the entire width of the object with a single travel of the optical system across the same. Accordingly the object is scanned in strips. Fig. 8 shows two methods of accomplishing this. In the diagram A the optical system travels across the strip C from right to left. The system is then rendered inactive by closing a shutter, turning off lights, or otherwise, and is moved back to the right hand side of the object, and then moved downward a distance equal to the width of the strip and the object is then again scanned from right to left, and so on until the entire surface of the object is covered. Diagram B shows an alternative mode of operation in which the optical system is moved from right to left, then down a step and from left to right, then down another step, and so on. In this instance it is not necessary to close a shutter or perform any equivalent operation.

It should be noted that if the reduction in scale of the photograph is to be 1:N and an image erecting system is employed, then in the lateral movements, left to right and back again, shown in A and B, Fig. 8, the ratio of the speed of motion of the plate to that of the optical system must be $(1-1/N):1$, and also the amounts of transverse displacement, parallel to the arrows $w$, between the photographing of strips such as C must be in the same ratio, $(1-1/N):1$, for the amount of displacement of the plate compared with that of the optical system. If no erecting device is employed the ratio of the corresponding motions is $(1+1/N):1$.

*General Purpose Photographic Scanner*

In Figs. 9 to 22 inclusive, a practical embodiment of a scanning camera is illustrated. This design is specially adapted for scanning an object of which it is desired to make an orthogonal photograph, such for instance as a piece of machinery or mechanical object, diagrammatically represented at A, which may be mounted on any suitable stationary support such as B, Figure 9. The scanner is arranged to operate in a vertical plane, and, as illustrated, is not provided with an image-erecting optical system, although it could be modified for use with such a system if desired. The instrument as shown is constructed to make a reduced photograph of the object on a scale ratio of 1 to 4. While the instrument is illustrated as arranged to photograph the object as projected on a vertical plane, it could readily be mounted so as to operate in a horizontal or any other position desired.

The scanner comprises a bed plate 100 mounted on feet 101 and carrying a pair of upright standards 102 and 103 at its ends. The bed plate also carries an electric motor 104 provided with reversing control mechanism indicated at 105 (Figs. 10 and 22). The standards 102 and 103 support, and are connected by, an upper horizontal guide rod 106, and a lower horizontal guide rod 107. A frame 108, on which is mounted the carriage for the optical or lens system of the camera, and which will hereinafter be referred to briefly as the optical frame, is mounted to slide on the rods 106 and 107. The frame has an open center, as indicated at 109 and has bearing sleeves 110 and 111 sliding on the rod 106, and bearing sleeves 112 and 113 sliding on the rod 107. The frame 108 also carries a pair of vertical guide rods 114 and 115 on which is mounted the vertically movable carriage 116 which carries the optical system of the camera and will be referred to briefly as the optical carriage. The carriage 116 has perforated lugs 117 and 118 which slide on the rods 114 and 115 respectively. The rod 115 is shown as square and provided on one face with spaced notches 119, for a purpose which will be explained below. Mounted in an opening 120 (Fig. 11) in the carriage 116 is the camera objective lens mount 121. The objective 122 may be of any suitable type, such as a high grade anastigmat, and is not therefore illustrated in detail. Fixed to the lens mount is a tube 123 which projects horizontally toward the object to be photographed, and carries at its outer end a telecentric lens 124. (Figs. 10 and 16.) The principal focus of the telecentric lens 124 coincides with the outer nodal point of the camera objective 122, so that the only rays passing toward and away from the nodal points of the camera lens 122 in their passage to the plate 125 are rays which leave the object in substantial parallelism with the optical axis of the lens 122. Projecting from the rear of the lens mount in the direction of the plate is a tube 126.

A second frame 127, hereinafter referred to as the plate frame, is mounted to slide on the rods 106 and 107. This frame has an open center as indicated at 128, and is provided with bearing sleeves 129 and 130 sliding on the rod 106, and with bearing sleeves 131 and 132 sliding on the rod 107. The frame 127 carries a pair of vertical guide rods 133 and 134, the latter being shown as of square section and provided on one face with notches 135 for a purpose to be described below. Mounted to slide vertically on the rods 133 and 134 is the plate carriage 136 which has lugs 137a and 137b, 138a, and 138b through which the guide rods 133 and 134 pass respectively. The plate carriage has on its face a frame 139 adapted to receive a holder 140 for sensitized plates or films. The holder 140 is illustrated as an ordinary plate holder having in it sensitized plates 141. The plate carriage is connected with the adjacent end of the tube 126 in such a manner as to exclude light, while permitting relative movement between the plate carriage and tube. As shown in Figs. 11, 12 and 13, this is accomplished by the use of a flexible bag or bellows 142. While the optical frame 108 and the plate frame 127 both slide longitudinally on the rods 106 and 107, it will be noted that there is room for the frame 127 to move relatively to the frame 108 within the space between the bearing sleeves 110 and 111, 112 and 113, of the frame 108.

For driving the frames 108 and 127 longitudinally, a pair of feed screws is provided, screw 143 engaging the half nut 144 on the frame 108, and screw 145 engaging the half nut 146 on the frame 127. In the machine illustrated, the optical system is provided with no image-erecting device, so that the plate frame 127 must move at a faster rate than the optical frame. This differential movement may be secured by any suitable gearing, but as illustrated is accomplished by making the pitch of the screw 145 greater than the pitch of the screw 143 in the ratio of 5 to 4, i. e., $(1+1/N):1$. The two screws are driven at a uniform angular speed, this being shown as accomplished by intermeshing similar gears 147 and 148 on the respective screws 143 and 145, the screw 145 extending beyond the end frame 102 and carrying a pulley 149 driven by a belt 150 from the electric motor 104. One of the screws has a right hand thread, and the other a left hand thread, as shown.

The optical carriage 116 is fed vertically on the guide rods 114 and 115 of the optical frame 108 by means of a reciprocating feed rod 151 which is provided on one face with transverse notches 152 (Fig. 13). The rod 151 is mounted for limited vertical reciprocating motion in aligned holes in the lugs 153 and 154 at the bottom and top, respectively, of the optical frame 108. The rod 151 also passes through openings in the lug 118 on the optical carriage. The upper lug 118 on the optical carriage 116 has a transverse hole in it through which slides the pawl 155 which has a downwardly facing wedge shaped end 156 adapted to engage the notches 152. The pawl 155 is normally pressed towards the bar 151 by a spring 157 mounted in a recess in the lug 118 and it may be manually retracted against the pressure of the spring by a knurled head 158. The lug 118 also carries a second pawl 159, similar to pawl 155, adapted to engage the notches 119 in the square guide rod 115. (Figs. 9 and 10). The reciprocating feed rod 151 is normally in down position, as shown in Figs. 9 and 13, to which position it is urged by gravity assisted, if necessary, by a spring 160. At the end of every scanning travel of the frame 108 (to the left in Fig. 9) the rod 151, which has on its lower end a roller 161, engages a cam 162 which is adjustably mounted on a rail 163 supported between the standards 102 and 103. The cam may be locked in any desired position on the rail by the set screw 164. When the frame 108 reaches the left end of its travel the roller 161 rolls up the cam 162, thus lifting the rod 151, which carries with it owing to the engagement of pawl 155 in a notch 152, the optical carriage 116. As the carriage moves up, the tooth on the pawl 159 slides out of a notch in the guide rod 115 and moves up into engagement with the next higher notch in the guide rod. The carriage is thus firmly held in its raised position. When, due to reversal of the motor 104, the frame 108 starts its return movement to the right, the roller 161 slides off the cam 162 and the feed rod 151 moves back to its original position, the pawl 155 snapping out of the lower notch on the feed rod 151 into the next higher notch thereon, ready for the next feeding step which takes place at the end of the next reciprocation of the frame 108 to the left. In this way it will be seen that every time the frame makes a complete reciprocation, the optical carriage is raised through a distance of one notch on the guide rod 115. As the notches may readily be cut with high precision an accurate step by step feed of the carriage is thus provided. At any time it is desired to return the carriage to a lower position this may be accomplished by merely retracting the pawls 158 and 159 by hand and sliding the carriage down.

The means for producing step by step vertical feed of the plate carriage is in all respects similar to that described for feeding the optical carriage, except that the notches in the guide and feed rods are spaced further apart than the notches in the rods 115 and 151. This greater spacing of the notches provides for greater upward movement of the plate carriage, which is in the same ratio to the corresponding upward movement of the optical carriage as the ratio between the longitudinal movements of the plate frame and optical frame respectively, viz., $(1+1/N):1$. The plate frame carries a reciprocating feed rod 165 corresponding with the optical carriage feed rod 151, with feed notches as shown at 166, and the carriage guide lug 138a carries a feed pawl 167 engaging with the notches 166, and a holding pawl 168 engaging with the notches 135 in the face of the square guide rod 134. The plate carriage feed rod 165 is slidably mounted in lugs 169a and 169b on the plate frame and is urged downwardly by gravity and by the spring 170, and carries at its lower end a roller 171 which is adapted, at the left hand limit of travel of the frame 127, to ride up on a cam 172 which is held in adjustable position on the track 173 by a set screw 174. The cams 162 and 172 are set in adjusted positions upon their tracks, dependent upon the length of scanning travel of the frames necessary to cover the size of object being photographed.

With the arrangement described it will be seen that the rotation of the feed screws 143 and 145 will cause the optical and plate frames to move to the left so as to cause the telecentric lens 124 to sweep in a horizontal path from right to left across the object. At the same time the plate frame is moved from right to left but at a higher speed in the ratio $(1+1/N):1$, so that when the telecentric lens reaches the left hand end of the object, the plate will have moved from its initial position where its left hand edge was opposite the axis of the optical tube 126, to a position in which its right hand end is opposite the axis of such tube. Thus a horizontal strip of the plate has been exposed from left to right while the telecentric lens has scanned the object from right to left. Since with the optical system shown the image is inverted, this opposition of operations is necessary if a point to point correspondence between elements of the object and corresponding elements of the image on the plate is to be attained. Under the conditions specified, with the camera focused on the object, a sharp image will be formed on the plate, and this image will be stationary with respect to the plate during all phases of the exposure. At the end of each scanning stroke the rollers on the lower ends of the carriage feed rods engage their respective cams, thus lifting the optical and plate carriages through distances of one notch on their respective feed rods. This will feed the plate carriage slightly more each time than the optical carriage, in the ratio of (1+1/N):1, so that when the telecentric lens reaches its last scanning position adjacent to the top of the object, the plate will have moved up to a position as indicated in dotted lines 141' in Fig. 9, in which the lower edge of the plate is aligned with the axis of the optical tube 126. Thus the entire plate has been exposed when the entire object has been scanned, and the inverted photograph covers the whole plate (or such part thereof as it is necessary to use.)

In the machine as illustrated exposure of the plate is made only during the travel of the frame from right to left. This has the advantage of avoiding possible errors due to backlash in the mechanism, which might be present if the exposures were made in both directions of travel. The latter arrangement is possible if provision is made to avoid all backlash and if the construction is such that the carriages will be fed an upward step at each end of the reciprocatory travel of the frames. However the machine as shown is simpler and easier to construct with satisfactory accuracy. With such single directional scanning it is necessary to prevent exposure of the film during the return travel of the frames from left to right. This is accomplished in the construction illustrated by providing a shutter 175, Fig. 15, which may be of any suitable type, such as the diaphragm shutter indicated. The shutter may be operated in any suitable manner, as for instance by the cable release 176, the end of which is shown as attached to an activating rod 177, Figs. 14 and 15, slidably mounted in the optical frame 108 and carried therewith. The lower end of the rod 177 carries a roller 178 which engages with the cam 162. In this arrangement when the roller 178 rolls up the cam 162 it actuates the cable release 176 so as to trip the shutter, causing the same to close, as shown in Fig. 15, and the shutter will remain closed until the frame reaches the right hand limit of its travel. At that time it is desired to open the shutter, and this is accomplished by providing a cam 179, Fig. 9, mounted on the track 163, with which the roller 178 engages. The cable release 176, preferably of the well known antinous type, is so constructed that successive depressing of the roller 178 at the end of the cable will cause the shutter to open and close alternately. The shutter is so set that when the cable release is operated by the roller 178 riding up the cam 179 the shutter will be opened and will be closed when the roller 178 rides up the cam 162, Fig. 10. In this way successive strips of the plate are exposed as the frames 108 and 127 travel to the left, Fig. 9, whereas no exposure occurs on the return trip of the carriages, the shutter then being closed.

It is possible to control the motor by hand switches and to reverse the feed of the screws either by reversing the motor directly or by means of any suitable reversing mechanism. However it is desirable to make the machine automatic in operation as far as possible, and suitable controls for this purpose are indicated. The motor 104 is shown as of a type which may be reversed by shifting the position of the brushes 181 (Fig. 22). The reversal is accomplished by means of a solenoid 182, the armature 183 of which is connected by suitable linkage to a brush carrying reversing ring 184. Whenever the solenoid is not energized the brushes are held in the position shown in Fig. 22 by the spring 185 and whenever the solenoid is energized the brushes are shifted so as to reverse the rotation of the motor. The main reversing switch 186, Figs. 9 and 13, in the solenoid circuit, is shown as mounted on the lug 153 on the optical frame 108. When the frame reaches the left hand limit of its travel the switch engages a stop 187, Fig. 15, which is shown as attached to the cam 162. This engagement causes the switch to snap over and starts the reverse travel of the frames. When the frames reach the right hand position, the switch 186 engages a stop 188, Fig. 9, adjacent to the cam 179 which again reverses the motor and starts the frames on a new scanning stroke. As a safety precaution it is desirable to provide safety switches 189a and 189b, Fig. 9, at the limits of the maximum stroke of the apparatus. These switches are interposed in the motor circuit and in the event that the reversing switch 186 should fail in its operation for any reason, one or the other of them would be engaged by the frame, depending upon the direction of its travel, so that the motor circuit would be positively broken and travel of the carriage stopped before injury to the apparatus could occur. A similar safety switch 189c is preferably provided near the top of one of the frames, as for instance the frame 127, where it would be engaged by the plate carriage 136 when it reached the upper limit of its movement, thereby positively stopping any further feed.

The motor circuit is preferably provided with a rheostat 190 or other suitable means for regulating the speed of travel of the frames and carriages. It is important to provide some regulating means for this purpose, as the exposure of the photographic plate is determined by the speed of travel of the optical system over the plate as well as the limiting aperture of the optical system such as the iris diaphragm of the shutter 175.

During the scanning process the plate is exposed in successive longitudinal strips. As the optical system moves over the plate at a uniform speed throughout each strip no difficulty is experienced in securing a substantially uniform and unbroken exposure throughout each strip. In order to secure a satisfactory effect in the finished photograph, however, it is desirable to have the successive strips joined accurately, so that they do not on the one hand overlap resulting in an over-exposed strip, or on the other leave an under-exposed line between them. For adjusting the line of juncture between successive strips it is desirable to use an adjustable mask placed adjacent to the telecentric lens. Such a mask is shown at 191 in Figs. 16 and 17, and comprises two mask plates 192a and 192b mounted to slide in a frame 193. Adjusting screws 194 may be provided for securing accurate adjustment of the mask plates. The avoidance of any visible line between successive strips is facilitated by shaping the mask plates in such a way as to provide adjacent overlapping areas of partial illumination. Figs. 17 and 18 show a preferred form of mask for accomplishing this purpose, each of the plates having a pointed notch 195 therein so that the mask opening is in the general form of a hexagon. The mask is so adjusted that the distance between the apex of one notch and the base of the other notch is equal to the lateral displacement of the optical carriage 116 between successive reciprocating motions in photographing successive strip areas of the object. There is an overlap represented by the distance $w$ between the successive strips, this overlap being only partly exposed at each travel of the optical system so that the combined exposure on this region of penumbra due to successive photographing of adjacent strips of the object will be uniform and exactly equal the normal exposure permitted by the portion of the mask opening of maximum width, so that a substantially uniform exposure throughout the entire photograph will be secured.

Instead of the shape of the mask shown in Fig. 18 other shapes may be used, accomplishing a similar result, such as the trapezoidal shape shown in Fig. 19, or the shape with oppositely inclined ends shown in Fig. 20. Other shapes accomplishing a similar result may of course be employed.

In some designs of the apparatus the mask shown in Figs. 17 and 18 is preferably omitted and in its place the optical tube 126 nearest to the plate is provided with an aperture mask and this may desirably be made adjustable as illustrated for instance in Fig. 21. The construction here illustrated comprises a base plate 196 having a large opening 197 therein, which carries two longitudinally adjustable notched masked blades 198 and two laterally adjustable straight blades 199. In order that the masking device shown in Fig. 21 should control the area of exposure in the same manner as the arrangement described in connection with Figs. 16, 17, 18, 19 and 20 it is merely necessary that the shapes of the openings in the masks should be identical, with the linear scale of the dimensions of the opening in the mask shown in Fig. 21 reduced in the ratio 1:N as compared with the opening effected in accordance with Figs. 16, 17, 18, 19 and 20.

When adjusted as hereinbefore specified the devices shown in Figs. 16 and 17 and that illustrated in Fig. 21 will produce identical results, with regard to exposure, when employed in photographing an object. It is worthy of note that if the masking device shown in Fig. 21 is employed it should be located as close as possible to the photographic plate.

*Relief photograph scanner*

In Figs. 23 to 33 inclusive, a scanning camera of modified construction is illustrated which is especially adapted for photographing objects placed on a horizontal support or table. The construction is particularly designed for the photographing of relief models of terrain while under projection apparatus such as the well-known Multiplex equipment. The general arrangement of the apparatus when used in connection with the Multiplex projectors is illustrated in Fig. 23 in which 200 is a table on which are mounted the standards 201 carrying the longitudinal supporting bar 202 of the usual Multiplex apparatus. Adjustably supported by the bar 202 are a plurality of Multiplex projector heads 203 only one of which can be seen. The relief model 204 of terrain to be photographed rests on the table 200 under the projectors so that one or more of the aerial diapositives placed in the projector heads may be projected upon and in registry with the model. As in the Multiplex apparatus the projector heads are set up in positions corresponding to the positions of the cameras at the time the photographs were taken, the photographs are projected upon the model from positions corresponding to the scale of the model, with the positions from which the photographs were made, and exact correspondence between the photographs and the relief of the model can be secured. The scanning camera is shown at 205 and may conveniently be mounted on a stand 206 which may be moved into juxtaposition to the Multiplex apparatus. In this embodiment of the scanner, the optical and plate frames and carriages move in horizontal planes, and the optical tube 207 carrying a telecentric lens 208 projects laterally beneath the Multiplex projector heads and over the model. This construction enables the scanner to be used without interference with the Multiplex apparatus, as the only part of the scanner which extends into the field of the photographs projected by the Multiplex is the optical tube 207 which can be made of small dimensions so as to cast a very narrow shadow as it moves over the model. The general construction and operation of this type of scanner is similar to that already described with such changes as are necessary to adapt it to operation in a horizontal plane. This scanner is also shown as embodying an image erecting optical system, although this is not essential, as it could be made to operate without erecting the image.

The scanner comprises a frame including a bed plate 209 carrying uprights 210 and 211 to which are attached longitudinally extending horizontal rails 212a and 212b for carrying the plate frame, and 213a and 213b for carrying the optical frame.

The plate frame comprises a pair of transverse frame members 214a and 214b, connected by the end pieces 215a and 215b (Fig. 24). Rails 216 and 217 are rigidly attached to the frame members 214a and 214b. The rail 212a, as shown, has a V-shaped upper edge and the lower surface of the end piece 215a is grooved to engage it. The other rail may be similarly V-shaped, but is more conveniently made flat and engaged by a flat surface on the frame member 215b. The transverse frame members 214a and 214b are provided with transverse track flanges 216 and 217, the upper edges of which are made true so as to constitute tracks for the plate carriage 218. The track flange 217 as shown, is provided with a V-shaped upper edge, while the other track flange 216 has a flat edge, the plate carriage 218 having downwardly extending flanges 219a and 219b (Fig. 25) resting on said track flanges 216 and 217. The plate carriage 218 has a central opening above which is mounted the plate or film holder 220 which is retained in the frame 221 rigidly fixed to the plate carriage. The plate carriage has brackets 222 which carry rollers 223 engaging the under surfaces of ribs 224 on the track flanges 216 and 217, said rollers being preferably pressed upward against such surfaces by spring 225 supported by adjusted screws 226.

Mounted on the lower pair of longitudinal rails 213a and 213b is the optical frame which comprises the transverse frame members 227a and 227b which are connected by the end pieces 228a and 228b. The transverse frame members 227a and 227b are provided with transverse track flanges 229a and 229b on the true upper surfaces of which slides the optical carriage 230. The optical carriage is preferably provided with a pair of retaining rollers 231 mounted on a bar 232 which is urged upwardly by a pair of springs 233, supported on adjusting screws 234. The rollers engage under ribs 235 formed on the flanges 229a and 229b. By adjusting the screws 234 the pressure of the rollers against the ribs may be varied so as to regulate the pressure of the optical carriage against its tracks.

Suitable mechanism is provided for feeding the plate and optical frames longitudinally on their respective rails, 212a and 212b, 213a and 213b. As illustrated, particularly in Fig. 25, the feeding means comprises a pair of lead screws 236a and 236b, one of which is left handed, said screws being linked together by meshed gears 237 and driven by the pulley 238 and belt 239 from an electric motor 240. An arm 241 projects from the plate carriage 218 and carries a nut 242 which engages the thread on the screw 236a while the optical carriage 230 carries a nut 243 which engages the thread of the screw 236b. As this construction is provided with an optical image-erecting device it is necessary for the optical frame to travel faster than the plate frame, so the screw 236b is made of greater pitch than the screw 236a, in the ratio 1:(1—1/N). For feeding the plate carriage 218 transversely of the machine on the tracks of the plate frame suitable feeding means are provided which are illustrated as comprising the feed rod 244 provided in its upper surface with notches 245 which are adapted to be successively engaged by a pawl 246 slidably mounted in a bracket 247 on the side of the plate carriage and yieldingly pressed towards the feed rod by a spring (not shown). The feed rod is mounted for limited endwise reciprocating movement in openings in lugs 248a and 248b on the plate frame. On one end of the rod 244 is mounted a roller 249 which is adapted to engage with a cam 250 adjustably mounted on the cam track 251 secured to the frame uprights 210. At the other end of the feed rod 244 is a spring 252 which urges the feed rod to its retracted position when the roller 249 is not in engagement with the cam 250. The action of the feed rod, the cam and the pawl on the plate carriage is similar to that described in connection with the embodiment of the machine shown in Figs. 9 to 22. However, as the travel of the carriage is in a horizontal plane, it is not necessary to provide a holding pawl for engagement with notches in a fixed member, but the carriage will stay in the position to which it is moved by the feed rod. The friction on the tracks, increased to such extent as may be necessary by the pressure of the spring pressed rollers 223, prevents accidental displacement of the carriage.

For feeding the optical carriage 230, Fig. 28, along the tracks on the optical frame, a reciprocating feed rod 253 is provided, similar to the feed rod 244. The notches 254 in the feed rod 253 which are engaged by the spring controlled pawl 255 mounted in the bracket 256, are spaced further apart than the notches 245 in the plate carriage feed rod because the optical carriage travels further than the plate carriage in this embodiment of the invention in the ratio 1:(1—1/N). The feed rod 253 is engaged at one end by a spring 257 and carries at its other end a roller 258 which engages a cam 259 adjustably mounted on the cam track 260 attached to the frame uprights 210 and 211.

The optical system is most clearly shown in Figs. 28, 29, 30 and 31. It comprises a prism box 261 mounted on the optical carriage and supporting the horizontal optical tube 262 and the vertical optical tube 263. The optical tube 262, which is conveniently made in telescopic sections, carries an extension 264 which is shown as of narrow rectangular shape, so as to cast as little shadow as possible, and it carries at its outer end a right angle prism 265 below which is mounted the downwardly facing telecentric lens 266. The telecentric lens is preferably provided with an adjustable mask device 267 similar to the mask arrangement shown in Fig. 16. The vertical optical tube 263 includes the mount 268 for the photographic lens 269 which may be of any suitable type of objective. Also mounted in the optical tube 263 is the shutter 270 which may be of any suitable type and is controlled by a cable release 271 in a manner to be described. At the upper end of the vertical optical tube may be placed an adjustable aperture plate 272 which is preferably similar in construction to that shown in Fig. 21. A light-tight loose flexible bag or bellows 273 extends from the end of the vertical optical tube to the plate carriage 218, so as to shield the lower side of the plate holder 220 from stray light.

Since the form of scanner now being described is designed to operate with an erected image, a suitable image erecting system is provided. As illustrated, this comprises a set of prisms mounted in the prism box 261, and arranged in conjunction with the prism 265 to erect the image on the plate. The prisms mounted in the prism box comprise an inverted right angled prism 274a with its axis extending transversely of the longitudinal axis of the horizontal optical tube and a smaller right angular prism 274b covering one-half of the horizontal face 275 of the prism 274a. The prism 274b is in alignment with, but set in reverse position to the prism 265. The path of the rays is as shown in Fig. 31, the rays coming up through the telecentric lens and prism 265 and being reflected by the latter to the prism 274b which reflects the rays downwardly against one of the angular faces of the prism 274a and thence across to the other angular face of said prism which reflects the rays upwardly through the horizontal surface 275 of the prism and through the camera lens 269 to the plate. As this prism arrangement results in erecting the image, the optical frame and carriage and optical system move faster than the plate frame and carriage, in the ratio 1:(1—1/N), in accordance with the principle explained above. The system is equivalent to that indicated diagrammatically in Fig. 7.

The form of scanner shown in Figs. 23 to 33 is arranged to expose the plate only in one direction of movement of the frames. This is merely for mechanical convenience and increased accuracy, as already stated, but the scanner could be arranged to scan on both forward and backward travels of the frames. When used as described, however, it is necessary to close the shutter during the reverse travel of the frames, and this is accomplished by means of the shutter cable release 271, the end of which is connected to a reciprocating rod 276, Fig. 24, mounted to slide in a bracket 277 on the under side of the plate frame member 214b. At the end of the frame release rod is a roller 278 adapted to engage a surface on the cam 250 which will act to open the shutter at the beginning of the scanning stroke. At the end of the scanning stroke the roller 278 engages a cam 279 which will trip and close the shutter.

The photographic scanning of a model of terrain under a projector presents a special problem because it is desired to photograph not only the model, but also the picture projected on the surface of the model, and it is important to do this without having objectionable shadows cast on the model by the optical tube carrying the telecentric lens. The elimination of shadows is taken care of when photographing under the Multiplex apparatus in the manner indicated in Fig. 32. In the Multiplex apparatus at least two projectors are used, Fig. 32 showing three projectors in position. In each of these projectors an aerial diapositive is placed, these diapositives representing, in part at least, a common area of terrain. This condition necessarily obtains in the use of the Multiplex apparatus, as it is by use of the overlapping portions of the photographs that the plastic image, which is the basis of the Multiplex process, is produced. In the example shown in Fig. 32, 204 is the model of terrain and 280a, 280b and 280c are the three projector heads. In this instance the entire model is of such size as to be included within the field projected by the central projector 280b. The angle of the projection cone covering the model is represented by the boundary rays 281a and 281b radiating from the central projector 280b. The projector 280a covers an area of the model between its right hand margin and the ray 282, and the projector 280c covers a part of the model between its left hand margin and the ray 283. The portions of the model within the field of projectors 280a and 280b receive an identical image from each of these projectors, and the same is true of the portions of the model covered by projectors 280b and 280c, so that it makes no difference which of the projectors is casting the image on the model, the position of the image of any element of the terrain being independent of which projector is casting the image. When the optical tube extension 264 is in a position under any one of the projectors that part of the image cast by such projector which would otherwise fall below the extension tube will be obscured by the shadow of the tube. When this condition obtains means are provided for shutting off the projector immediately above the optical tube and turning on one of the adjacent projectors, so that the portion of the model immediately below the tube, which is in process of being photographed, is illuminated by the image cast by a projector occupying a lateral position with respect to the tube. Thus the shadow of the tube is never in the field of view being photographed at any instant.

The process of turning the different projectors on and off so as to effect this result is accomplished by means of suitably placed electrical switches, automatically controlled by moving parts of the machine while in operation. In this way by controlling the proper projectors at the proper times, during the passage of the optical tube over the model, the entire surface of the model may be photographed without any shadows appearing in the resulting photograph. For instance, referring to Fig. 32, the model would be initially illuminated over its entire surface by lighting the lamp in the projector 280b. The optical tube would then start its scanning operation at the right hand margin of the model and would move towards the left until it reached a point midway between projectors 280a and 280b. At this point the controls will cause projector 280b to be turned off and projector 280a to be turned on. When the tube arrives at a position beneath projector 280b, projector 280a is turned off and projector 280c turned on. When it arrives midway between projectors 280b and 280c, projector 280c is turned off and projector 280b turned on. This process of alternating projection may be carried on with any number of projectors mounted in line. Consideration will show that under these conditions the shadow of the extension tube 262 can never interfere with the taking of a continuous photograph of the entire model, with superimposed image, beneath the projectors. Thus the entire model is scanned without any interference from shadows cast by the optical tube. This sequence of operations is continued for each scanning travel of the apparatus.

Any suitable switch mechanism may be employed for turning the projectors on and off at the proper times. In the example illustrated, and as more particularly indicated in Figs. 27, 28 and 33, the scanner is provided with a series of microswitches arranged in pairs, the number of pairs corresponding to the number of projectors. As shown in Fig. 33 the first pair comprises switches 285a and 285b; the second pair, switches 286a and 286b; and the third pair, switches 287a and 287b. Each of these switches is provided with an operating spring or lever 288 carrying a roller 289. A pair of switch operating runners 290a and 290b are mounted on one of the travelling frames, such as the optical frame 108. The runner 290b may be termed the circuit closing runner, and the runner 290a the circuit breaking runner. The runner 290b is slightly advanced in respect to the runner 290a, so that it will successively press down the rollers on the circuit closing switches 285b, 286b and 287b just before the runner 290a actuates the corresponding switches 285a, 286a and 287a.

Prior to the commencement of the scanning operation the circuit is closed through for the central projector 280b by turning the usual switch at the control box 283, which completes the circuit through the lead 291, the switches 285a and 285b, in parallel, the lead 292, the lamp of the projector 280b, and the return line 284b. When the circuit closing runner 290b reaches the roller of the switch 285b it pushes down the roller and arm 288, thus depressing the plunger 293, which pushes down the switch spring 294. This breaks the contact between the spring and the point 295a of the switch 285b, but does not break the circuit through the projector 280b, because the latter is still closed through the switch 285a until such time as the runner 290a reaches the roller 289 of the switch 285a. The actuation of the switch 285b by the advance runner 290b does, however, bring the spring 294 into contact with the point 295b, and this closes a circuit through lead 291, switch 285b, lead 296a, contact spring 294 of the switch 286b, lead 296b to projector 280a and the return line 284a. Very shortly after the circuit is thus closed through projector 280a the runner 290a reaches the roller 289 of the switch 285a, and breaks the circuit through projector 280b. The runner 290b is advanced slightly beyond the runner 290a so as to close the circuit through the projector to be lighted, in this instance 280a, a sufficient time before the circuit is broken through the already lighted projector 290b to permit the filament in the lamp to get up to temperature so that full illumination will be obtained by the projector 280a before projector 280b is turned off. This permits a uniform exposure to be obtained on the plate and avoids under-exposed areas which would occur if one projector were turned off at the instant the next projector was turned on. The reason for this is that with the type of lamp at present used in the Multiplex projectors the rate of diminution of intensity of illumination when the lamp is turned off is much greater than the rate of increase of intensity when the lamp is turned on. It has been found experimentally that if the second lamp is turned on a fraction of a second before the first one is turned off the combined illumination from the two lamps remains sufficiently steady during the transition from one lamp to the other to satisfy all practical requirements of the processes considered in the present connection.

Continued travel of the optical frame 108 with the attached runners 290a and 290b brings the runners next to the switches 286b and 286a. The actuation of switch 286b closes the circuit through the lead 291, the switches 285b, 286b and 287b, the lead 297, the projector 280c and the return circuit 284c, such action being immediately followed by the contact of runner 290a with the operating arm of switch 286a, thus breaking the current which operates the lamp in projector 280a. Further travel of the runners causes runner 290b to actuate the switch 287b so as to close the circuit through the point 298 and the lead 299, which again illuminates projector 280b. Immediately thereafter engagement of the runner 290a with the actuating member of switch 287a breaks the circuit through projector 280c. In this way the successive projectors are illuminated as required, so that the whole model can be photographed without any trace of shadow effect. If more than three projectors are used, as is frequently the case with the Multiplex apparatus, a similar sequence of operations would be followed and successive projectors illuminated so that the whole model could be scanned without shadow effect and a single photograph produced.

The scanning apparatus described above is also useful for producing orthogonal photographs of models of terrain having contour or grid lines marked or optically projected on the surface thereof either in association with the photographic detail of the terrain or without such photographic detail. Orthogonal photographs of models showing such lines, particularly the contour lines, are of great utility in the production of contour maps. The contour lines are preferably located on the surface of the model by carving such model from a laminated block, which causes the edges of the laminations to appear as contour lines, as more particularly set forth in application for U. S. Patent, Serial No. 214,208, filed June 17, 1938, Patent No. 2,309,627, dated February 2, 1943.

In my U. S. Patent No. 1,980,981 a method is described of using "rectified" or horizontalized photographic reprojections of airplane photographs for carving blocks to represent terrain, the vertical scale of said blocks having any desired ratio to the horizontal scales. The scanning methods and apparatus described in the present specification are adapted for use in conjunction with the methods, apparatus and carved models described in the said patent in the same manner as in connection with the Multiplex apparatus. In particular these methods and apparatus are applicable to the process of obtaining orthogonal photographs of models of terrain on the surfaces of which there are printed photographs of said terrain in correct registry with said model. Similarly the same methods and apparatus are applicable to the process of obtaining orthogonal photographs of models of objects other than terrain, with or without the photographic representation of said objects projected or printed thereon.

While I have described in detail certain preferred procedures which I have found to be convenient and efficient in practicing my invention, and while I have illustrated and described in detail certain forms of apparatus which I have found well adapted to carry out the required operations, I do not wish to be understood as limiting myself to the performance of the process in the precise manner set forth or the following of a particular sequence of operations where this is not essential to secure the intended result, or to the use of the particular apparatus as set forth in the specification, as I realize that changes both in procedure and in the apparatus are possible; and I further intend each step or sequence of steps and each element or instrumentality appearing in any of the following claims to be understood to refer to all equivalent steps, sequences of steps, elements or instrumentalities for accomplishing substantially the same result in substantially the same or equivalent manner.

I claim:

1. The method of making an orthogonal photograph free from errors due to parallax, of an object, the surface elements of which do not lie in a single plane, which comprises exposing a first strip of the object using only rays parallel to the optical axis of the camera or so nearly parallel thereto as not to be distinguishable in their photographic effect from parallel rays, by producing progressive relative movements between the optical system of said camera, a photo-sensitive element and said object so as to scan said object while maintaining the photo-sensitive element in fixed relationship with the elements of the image projected thereon by said optical system so as to produce progressively an image of each part of the object strip upon the corresponding part of a first zone of the photo-sensitive element, while maintaining the optical axis or axes of said camera optical system at all times in parallelism with a fixed axis or axes, and then repeating the operation to expose a second strip of the object parallel to and contiguous with the first, to produce an image of the second strip upon a second zone of the photo-sensitive element contiguous to and parallel with the first zone, and finally developing the photo-sensitive medium.

2. In the method as claimed in claim 1, the procedure which comprises partially shielding a marginal area of the first strip during the first exposure referred to to produce an under-exposure of said marginal area on a corresponding zone of the photo-sensitive element, and so effecting the second exposure that the second strip overlaps the first substantially to the extent of said shielded area and the first zone of the photo-sensitive element exposed is overlapped by the second to a corresponding extent, with the images of said area formed at the first and second exposures in coincidence with one another, while again shielding said marginal area as before, so that the combined effect of the exposures will be such that a sufficiently uniform exposure is obtained to produce substantially the effect of a photograph.

3. The method of preparing a photographic plan of terrain in which the planimetry of the terrain is correctly represented to scale without substantial distortion, which consists in preparing a scale model of the terrain, projecting a photograph of the terrain upon said model in registry therewith, and taking a photograph of said model with the projection thereon by means of a camera adapted to photograph at any instant only a small part of said model, and progressively moving the camera optical system so as to scan said model while maintaining the photo-sensitive element in said camera in fixed relationship with the elements of the image projected thereon by said optical system so as to photograph an image of each part of the model upon a corresponding part of the photo-sensitive element.

4. The method as claimed in claim 3 in which a plurality of photographs of the terrain is projected from different points upon said model in registry therewith, said photographs being projected in succession while the camera optical system is scanning the model, in such order that the areas of the model being scanned by said optical system at any instant are illuminated by rays free from interference from said system or its supports so that the casting of shadows by the optical system or its supports upon the area of the model being photographed at any instant is avoided.

5. The method of preparing a photographic plan of terrain in which the planimetry of the terrain is correctly represented to scale without substantial distortion, which consists in preparing a scale model of the terrain, projecting a photograph of the terrain upon said model in registry therewith, and taking a photograph of said model with the projection thereon by means of a camera adapted to photograph at any instant only a small part of said model, using only rays coming to the camera optical system which are normal to the datum plane of said model, or so nearly normal thereto as not to be distinguishable in their photographic effect from normal rays, progressively moving said optical system so as to scan said model while maintaining the photo-sensitive element in said camera in fixed relationship with the elements of the image projected thereon by said optical system so as to photograph an image of each part of the model upon a corresponding part of the photo-sensitive element and maintaining an axis of the optical system effectively normal to the datum plane of the model throughout the scanning operation.

6. The method of preparing a contour map of terrain which consists of photographing a scale model of terrain having contour lines visible on the surface thereof, by means of a photographic optical system having a field of view smaller than the extent of the model being photographed, and imparting, during exposure, a motion or motions altering the relative positions of the model, the photographic optical system and the sensitized surface on which the photograph is to be recorded, said motion or motions taking place in planes normal to an axis of the optical system and being of such rate and direction as to cause said objective to scan said model while maintaining the sensitized surface in fixed relationship with the elements of the image projected thereon by said optical system, so as to progressively produce an orthogonal image of said contour lines upon the sensitized surface.

7. A photographic apparatus comprising a camera objective, an objective support therefor, a holder for a sensitized photographic surface, a holder support therefor, an object support for holding the object to be photographed, and means for mounting at least two of said supports permitting diverse movement of said two supports in parallel planes normal to the optical axis of the camera objective, each of said movable supports being movable in two angularly related directions in said planes, and means for moving said movable supports through coordinated displacements in each of said directions.

8. A photographic apparatus comprising a lens system including a camera objective and a telecentric lens in front thereof, the principal focus of said telecentric lens coinciding with the outer nodal point of said objective, a support for said lens system, a holder for a sensitized photographic surface, a holder support therefor, an object support for holding the object to be photographed, and means for mounting at least two of said supports permitting diverse movement of said two supports in parallel planes normal to the optical axis of the camera objective, each of said movable supports being movable in two angularly related directions in said planes, and means for moving said movable supports through coordinated displacements in each of said directions.

9. In apparatus for producing orthogonal photographs of three dimensional objects or surfaces, a camera for holding a sensitized surface, an optical system including a camera objective, a telecentric lens in front thereof and image erecting elements, the principal focus of said telecentric lens coinciding with the outer nodal point of said objective, the field of view of said system as projected on said sensitized surface being smaller than the usable area of the sensitized surface, and means for producing, during exposure, coordinated relative motion of optical system, sensitized surface and object in diverse directions parallel to the sensitized surface, such that an image of each element of the object is progressively formed on said sensitized surface as different portions of the object are scanned by the telecentric lens, an optical axis of the system being maintained normal to the sensitized surface throughout the scanning operation.

10. In apparatus for producing orthogonal photographs of an object or surface the elements of which do not lie in a single plane, a camera for holding a sensitized surface, a camera objective for projecting an inverted image arranged to expose at any instant a portion only of said object or surface, said sensitized surface and camera objective being mounted for movement in parallel planes normal to the optical axis of the objective, and means for producing, during exposure, coordinated relative motion of camera, object and sensitized surface in such parallel planes in each of two diverse directions, the ratio of the distance moved by the sensitized surface to the distance moved by the objective being (1+1/N):1, where N is the ratio of the linear dimensions of the object being photographed to the linear dimensions of its inverted image of each element of the object focused on the sensitized surface, whereby an image is progressively formed on said sensitized surface as different portions of the object or surface are scanned by the objective.

11. An apparatus as claimed in claim 10 in which the camera objective has associated therewith an image-erecting means, the ratio of distance moved by the sensitized surface to the distance moved by the object being (1—1/N):1.

12. A scanning camera comprising an optical carriage, a camera objective carried thereby, a plate carriage having means for supporting a sensitized photographic surface, light excluding means for enclosing a camera space between said carriages, and supporting means for said carriages permitting diverse movement thereof in parallel planes normal to the optical axis of the objective, each carriage being movable in two angularly related directions, and means for moving said carriages through coordinated displacements in each of said directions.

13. A scanning camera comprising an optical carriage, a camera optical system carried thereby, a plate carriage for supporting a sensitized surface, light excluding means enclosing a camera space between said carriages, frames having guides thereon for supporting each of said carriages for movement in parallel directions, guides for supporting each of said frames for movement in parallel directions at right angles to the directions of movement of the carriages on the frames, means for feeding the frames along their respective guides, and means for feeding the carriages along the guides on their respective frames, said frame and carriage feeding means being constructed and arranged to produce co-ordinated displacements of the camera optical system and sensitized surface in each of two directions.

14. A camera as claimed in claim 13 in which the camera optical system includes image-inverting means.

15. A camera as claimed in claim 13 in which a telecentric lens is mounted in telecentric relationship in front of the camera objective.

16. In apparatus for producing orthogonally corrected photographs or maps, a support for a relief model of terrain, a projector, means for supporting said projector in position to project a photograph of the terrain upon a relief model of the terrain in registry therewith, and a photographic scanner for photographing the surface of the model while an image is being projected thereon by said projector, comprising a movable optical carriage having an optical system movable over said model, means for holding a sensitized surface in position to receive an image projected by said optical system, said optical system being adapted to transmit to said sensitized surface only rays leaving the model normal to the datum plane thereof, or so nearly normal thereto as not to be distinguishable in their photographic effect from normal rays.

17. An apparatus as claimed in claim 16 in which the optical system includes image erecting means.

18. In apparatus for producing orthogonally corrected photographs or maps, a support for a relief model of terrain, a plurality of projectors, means for supporting said projectors in position to project photographs of the terrain upon a relief model of the terrain, in registry therewith, and a photographic scanner for photographing the surface of the model with one or more images of the terrain projected thereon by said projectors, comprising a movable optical carriage, a movable plate carriage having means for holding a sensitized surface, light excluding means between said optical carriage and plate carriage so as to form a camera space, and an optical system carried by said optical carriage for transmitting an image of a portion of said model to said sensitized surface.

19. An apparatus as claimed in claim 18 in which means are provided which control the lighting of the different projectors in accordance with the movements of the optical system of the scanning camera.

20. In apparatus for producing an orthogonally corrected photograph of a design appearing upon a surface, the elements of which do not lie in a single plane, a projector supported in position to project the design on said surface, and a photographic scanner for photographing the design projected on said surface comprising a photographic optical system, a support for holding a sensitized element, and means for producing, during exposure, coordinated relative motion of the photographic objective, object surface and sensitized element, such that an image of said design is progressively formed on said sensitized element as different portions of said design are scanned by said photographic optical system, an optical axis of the photographic optical system being maintained normal to the sensitized element throughout the scanning operation.

21. Photographic apparatus comprising an optical system and a flat sensitized surface normal to the axis of said optical system, and means for imparting synchronized, continuous and coordinated motions of pure translation to said system and surface, in planes normal to the axis of said system whereby the relative position of said system and surface is continuously altered during the process of exposing said sensitized surface.

22. A scanning camera having an optical system mounted for movement in successive parallel scanning paths relatively to an object to be photographed, said paths extending longitudinally in the direction of scanning movement of said optical system, said optical system including an aperture mask have an aperture therein of greater dimensions transverse to the direction of the scanning paths than the width of such paths, so that there will be overlapping along the edges of successive paths which extend in the direction of scanning movement, that part of the aperture which overlaps being formed to transmit less light than the main opening of the aperture.

23. A scanning camera having an optical system mounted for movement in successive parallel scanning paths relatively to an object to be photographed, said paths extending longitudinally in the direction of scanning movement of said optical system, said optical system including an aperture mask having mask plates adjustable to vary the dimensions of the opening in the mask transversely to the direction of scanning movement, said plates having notched edges forming boundaries of the mask opening said notched edges lying in the direction of scanning movement.

24. A scanning camera having an optical system mounted for movement in successive parallel scanning paths relatively to an object to be photographed, said paths extending longitudinally in the direction of scanning movement of said optical system, said optical system including a camera objective and a telecentric lens mounted in telecentric relationship, and an aperture mask mounted in the front of said telecentric lens.

HEREWARD LESTER COOKE.

REFERENCES CITED

The following references are of record in the file of this patent:

UNITED STATES PATENTS

| Number | Name | Date |
| --- | --- | --- |
| 369,165 | Cannon | Aug. 30, 1887 |
| 897,733 | Goddard | Sept. 1, 1908 |
| 1,001,549 | Martens | Aug. 22, 1911 |
| 1,177,797 | Oppenheimer | Apr. 4, 1916 |
| 1,231,961 | Stoffels | July 3, 1917 |
| 1,351,279 | Barland | Aug. 31, 1920 |
| 1,393,793 | Kryzanowsky | Oct. 18, 1921 |
| 1,449,295 | Richards | Mar. 20, 1923 |
| 1,489,510 | Stromberg | Apr. 8, 1924 |
| 1,586,071 | Cooke | May 25, 1926 |
| 1,654,070 | Corlett et al. | Dec. 27, 1927 |
| 1,687,030 | Mitchell | Oct. 9, 1928 |

(Other references on following page)

UNITED STATES PATENTS

| Number | Name | Date |
|---|---|---|
| 1,751,774 | Trullinger | Mar. 25, 1930 |
| 1,825,122 | Oswald | Sept. 29, 1931 |
| 1,855,370 | Trenor | Apr. 26, 1932 |
| 1,892,683 | Robertson | Jan. 3, 1933 |
| 1,945,977 | Oswald | Feb. 6, 1934 |
| 1,966,261 | Petit et al. | July 10, 1934 |
| 1,980,657 | Bauersfeld | Nov. 13, 1934 |
| 2,039,412 | Heise | May 5, 1936 |
| 2,163,092 | Hobbs | June 20, 1939 |
| 2,200,594 | Diggins et al. | May 14, 1940 |
| 2,307,646 | Sonne | Jan. 5, 1943 |
| 2,309,752 | Cooke | Feb. 2, 1943 |

FOREIGN PATENTS

| Number | Country | Date |
|---|---|---|
| 1,009 | Great Britain | Apr. 8, 1865 |
| 16,175 | Sweden | May 30, 1901 |
| 181,633 | Germany | Aug. 26, 1918 |
| 85,501 | Austria | Feb. 15, 1921 |
| 430,995 | Great Britain | June 28, 1935 |

OTHER REFERENCES

"A Special Camera For Photographing Cylindrical Surfaces," December 5, 1925. Available from Government Printing Office.

McKinley, "Applied Aerial Photography," 1929, page 270.